United States Patent
Mishima et al.

(10) Patent No.: US 8,130,840 B2
(45) Date of Patent: Mar. 6, 2012

(54) APPARATUS, METHOD, AND COMPUTER PROGRAM PRODUCT FOR GENERATING INTERPOLATED IMAGES

(75) Inventors: Nao Mishima, Tokyo (JP); Ryusuke Hirai, Tokyo (JP); Yasutoyo Takeyama, Kanagawa (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 432 days.

(21) Appl. No.: 12/408,424

(22) Filed: Mar. 20, 2009

(65) Prior Publication Data
US 2009/0244389 A1  Oct. 1, 2009

(30) Foreign Application Priority Data
Mar. 27, 2008 (JP) .................................. 2008-84585

(51) Int. Cl.
*H04N 7/12* (2006.01)
(52) U.S. Cl. .................................................. 375/240.16
(58) Field of Classification Search .................. 348/441, 348/452, 699; 375/240.12, 240.15, 240.16; 382/236, 300
See application file for complete search history.

(56) References Cited

U.S. PATENT DOCUMENTS

| | | | | |
|---|---|---|---|---|
| 6,442,203 B1 * | 8/2002 | Demos | ...................... | 375/240.16 |
| 7,733,421 B1 * | 6/2010 | Sahu et al. | .................... | 348/452 |
| 2001/0017889 A1 * | 8/2001 | Borer | ....................... | 375/240.16 |
| 2004/0246374 A1 | 12/2004 | Mishima et al. | | |
| 2004/0252759 A1 * | 12/2004 | Winder et al. | ........... | 375/240.12 |
| 2007/0014477 A1 * | 1/2007 | MacInnis et al. | ............. | 382/236 |
| 2007/0230830 A1 | 10/2007 | Ohwaki et al. | | |
| 2007/0291843 A1 * | 12/2007 | Chappalli et al. | ........ | 375/240.16 |
| 2008/0240241 A1 | 10/2008 | Mishima et al. | | |

FOREIGN PATENT DOCUMENTS

| | | | |
|---|---|---|---|
| JP | 2003-163894 | | 6/2003 |
| JP | 2007-074590 | * | 3/2007 |
| JP | 2007-74590 | | 3/2007 |

\* cited by examiner

*Primary Examiner* — Thai Tran
*Assistant Examiner* — Stephen Smith
(74) *Attorney, Agent, or Firm* — Finnegan, Henderson, Farabow, Garrett & Dunner, L.L.P.

(57) ABSTRACT

An interpolated image generating apparatus calculates a motion vector reliability level indicating reliability of a motion vector used for inserting an interpolated image, the value of the motion vector reliability level being determined in such a manner that the stronger the correlation is between a source image area and a destination image area that are brought into correspondence with each other by the motion vector, the larger is the value. The apparatus also calculates a failure-preventing vector reliability level indicating reliability of a predetermined failure-preventing vector used for preventing image failures. The apparatus obtains a motion compensated image based on the motion vector, obtains a failure-preventing image based on the failure-preventing vector, and blends the motion compensated image and the failure-preventing image according to a weighted average thereof calculated by using a weighting factor based on the motion vector reliability level and the failure-preventing vector reliability level.

15 Claims, 14 Drawing Sheets

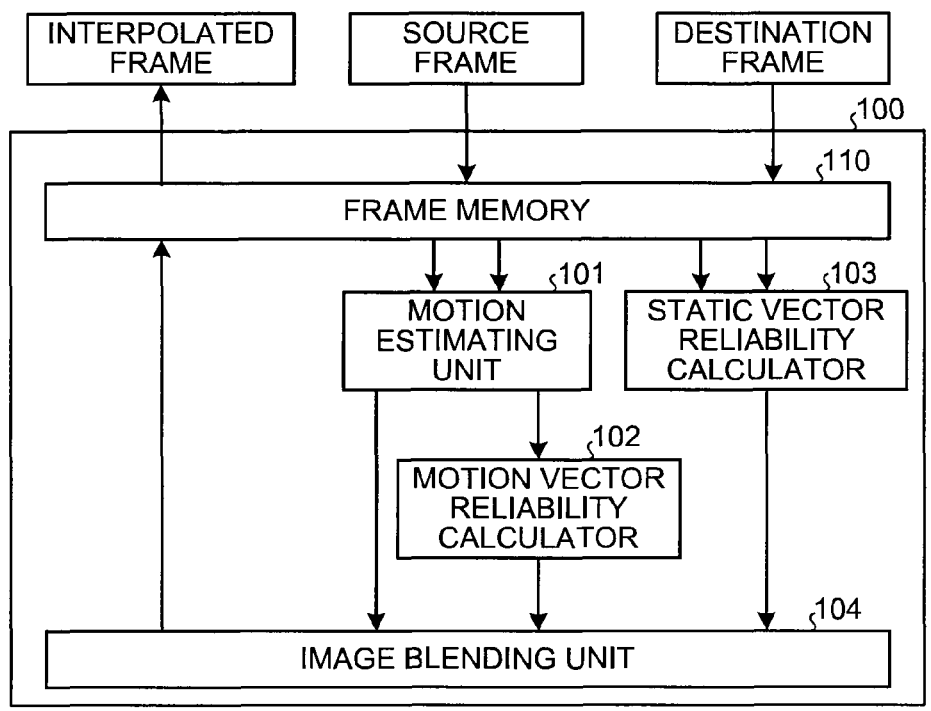
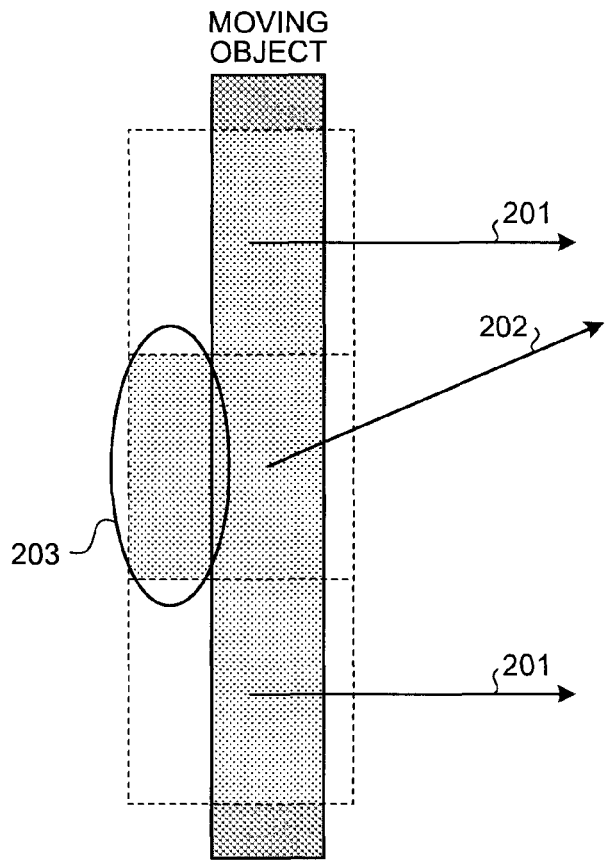

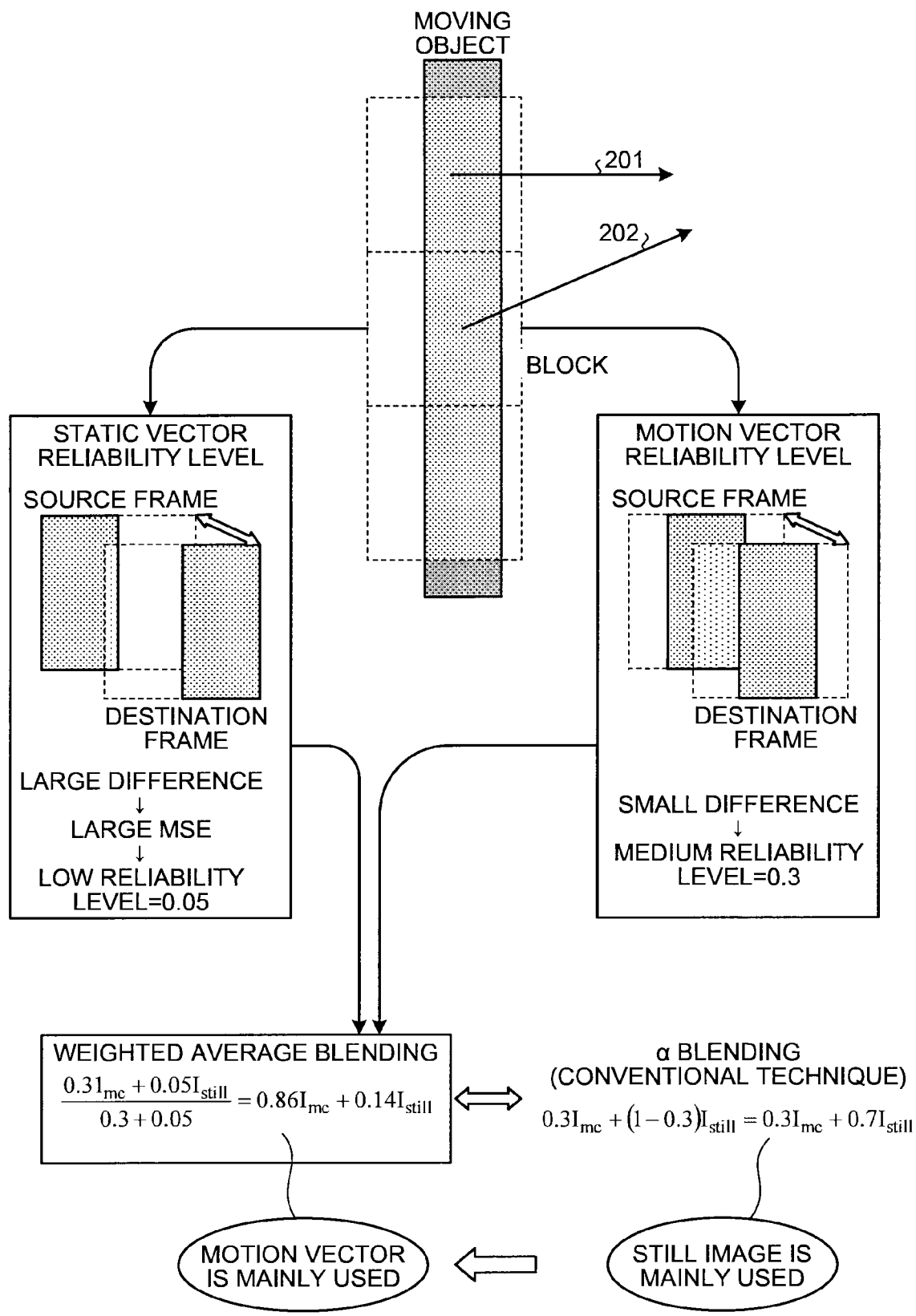

BLOCK DISTORTION t-1 FRAME  t FRAME  t+1 FRAME  t+2 FRAME

OCCLUSIONS

INTERPOLATED FRAME t-1 FRAME  t FRAME  t+1 FRAME  t+2 FRAME

OCCLUSIONS

INTERPOLATED FRAME

APPARATUS, METHOD, AND COMPUTER PROGRAM PRODUCT FOR GENERATING INTERPOLATED IMAGES

CROSS-REFERENCE TO RELATED APPLICATIONS

This application is based upon and claims the benefit of priority from the prior Japanese Patent Application No. 2008-84585, filed on Mar. 27, 2008; the entire contents of which are incorporated herein by reference.

BACKGROUND OF THE INVENTION

1. Field of the Invention

The present invention relates to an apparatus, a method, and a computer program product for generating an interpolated image to be inserted between a source image and a destination image.

2. Description of the Related Art

An example of a technique for smoothing moving images by generating an interpolated image to be interpolated between a source image and a destination image among the moving images is disclosed in JP-A 2007-74590 (KOKAI). According to this conventional technique, inconsistency among the motion vectors assigned to an inserted frame to be inserted between the source image and the destination image and the activities of interpolated images are calculated so that it is judged whether the interpolated images are to have a failure, based on the inconsistency among the motion vectors and the activities. Further, a 0-vector interpolated image is generated from a frame t and a frame t+1, and a blending ratio with which the 0-vector interpolated image is to be blended into the inserted frame is determined, so that the 0-vector interpolated image is blended into a failure portion according to the determined blending ratio.

According to the technique disclosed in JP-A 2007-74590 (KOKAI), a still image is used as a failure-preventing image that prevents the interpolated frame from having a failure caused by, for example, motion vectors having an error. Further, according to this technique, a reliability level of each of the motion vectors is calculated so that, based on the calculated reliability levels, a motion compensated image is used in an area in which the motion vector is reliable, whereas a still image is blended into an area in which the motion vector is not reliable. Thus, the robustness of the interpolated images is improved.

This conventional technique is based on an assumption that the motion vectors are not reliable, but the still image is reliable. There are many situations, however, in which this assumption does not hold true. For example, in the case where the image contains an object that moves (hereinafter, a "moving object"), if some of the motion vectors of the moving object has an error, the levels of reliability of these motion vectors are not so high. Accordingly, a large amount of the still image will be blended. As a result, the still image is blended into a part of the moving object, and the part with the still image is viewed as an artifact. Thus, a problem arises where it is not possible to generate interpolated images that are robust and have high quality.

SUMMARY OF THE INVENTION

According to one aspect of the present invention, an interpolated image generating apparatus generates an interpolated image to be inserted between a source image and a destination image, and the interpolated image generating apparatus includes a motion estimating unit that estimates a motion vector from the source image to the destination image, a first calculator that calculates a motion vector reliability level indicating reliability of the motion vector serving as a vector used for inserting the interpolated image, a value of the motion vector reliability level being determined in such a manner that the stronger a correlation is between an area in the source image and an area in the destination image that are brought into correspondence with each other by the motion vector, the larger is the value, a second calculator that calculates a failure-preventing vector reliability level indicating reliability of a failure-preventing vector that is a predetermined vector used for preventing image failures, and a blending unit that obtains a motion compensated image by performing a motion compensating process based on the motion vector, obtains a failure-preventing image by performing a motion compensating process based on the failure-preventing vector, and generates the interpolated image by blending the motion compensated image and the failure-preventing image according to a weighted average of the motion compensated image and the failure-preventing image that has been calculated by using a weighting factor based on the motion vector reliability level and the failure-preventing vector reliability level.

According to another aspect of the present invention, an interpolated image generating method generates an interpolated image to be inserted between a source image and a destination image, and the interpolated image generating method includes estimating a motion vector from the source image to the destination image, calculating a motion vector reliability level indicating reliability of the motion vector, a value of the motion vector reliability level being determined in such a manner that the stronger a correlation is between an area in the source image and an area in the destination image that are brought into correspondence with each other by the motion vector, the larger is the value, calculating a failure-preventing vector reliability level indicating reliability of a failure-preventing vector that is a predetermined vector used for preventing image failures, and generating the interpolated image by obtaining a motion compensated image by performing a motion compensating process based on the motion vector, obtaining a failure-preventing image by performing a motion compensating process based on the failure-preventing vector, and by blending the motion compensated image and the failure-preventing image according to a weighted average of the motion compensated image and the failure-preventing image that has been calculated by using a weighting factor based on the motion vector reliability level and the failure-preventing vector reliability level.

A computer program product according to still another aspect of the present invention causes a computer to perform the method according to the present invention.

BRIEF DESCRIPTION OF THE DRAWINGS

FIG. 1 is a functional block diagram of an interpolated image generating apparatus according to a first embodiment of the present invention;

FIG. 2 is a schematic drawing for explaining an α-blending process;

FIG. 3 is a schematic drawing for explaining how an interpolated frame is generated;

DETAILED DESCRIPTION OF THE PREFERRED EMBODIMENTS

Figure 4:
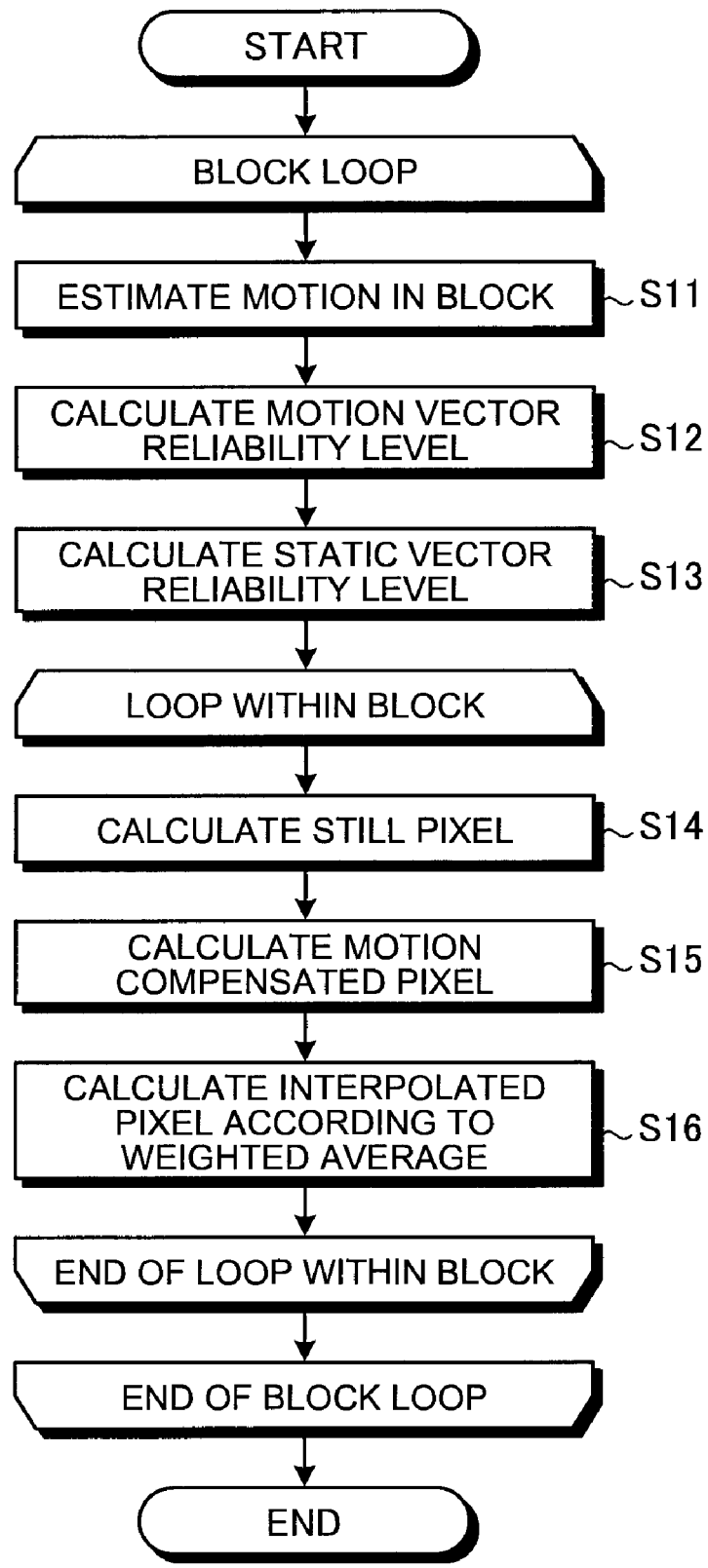
FIG. 4 is a flowchart of a procedure in an interpolated frame generating process according to the first embodiment.

Exemplary embodiments of an apparatus, a method, and a computer program (hereinafter, "program") for generating an interpolated image according to the present invention will be explained in detail, with reference to the accompanying drawings.

As shown in FIG. 1, an interpolated image generating apparatus 100 according to a first embodiment of the present invention includes: a motion estimating unit 101; a motion vector reliability calculator 102; a static vector reliability calculator 103; an image blending unit 104; and a frame memory 110.

The interpolated image generating apparatus 100 according to the first embodiment generates one or more frames with an interpolated image (hereinafter, "interpolated frames") to be inserted between a frame with a source image (hereinafter, a "source frame") among moving images and a frame with a destination image (hereinafter, a "destination frame") among the moving images and inserts the generated interpolated frames between the source frame and the destination frame, so as to smooth the moving picture by increasing the number of frames per unit time period. There is no particular limitation to the resolution, the size, and the frame rate of the moving picture and the number of interpolated frames.

In the following explanation, the pixel value of a source frame will be expressed as $I_{src}$, whereas the pixel value of a destination frame will be expressed as $I_{dst}$. It is also assumed that the temporal position of each of the interpolated frames to be inserted between the source frame $I_{src}$ and the destination frame $I_{dst}$ satisfies $0 \leq \Delta t \leq 1$ (where 0 is the temporal position of the source frame, and 1 is the temporal position of the destination frame).

According to the α-blending technique disclosed as a conventional technique in JP-A 2007-74590 (KOKAI), the still image is used as a failure-preventing image that prevents the interpolated frames from having a failure caused by, for example, motion vectors having an error. A level of reliability (i.e., a motion vector reliability level) indicating how appropriate each of the motion vectors is as a vector to be used for inserting the interpolated images is calculated. According to the calculated reliability levels, a motion compensated image is used in a reliable area in which the reliability level is equal to or higher than a predetermined value, whereas a still image is blended into an unreliable area in which the reliability level is lower than the predetermined value, so that the robustness can be improved.

This method is valid on an assumption that the motion vectors are not reliable, i.e., the still image is reliable. However, there are situations in which this assumption does not hold true. For example, let us discuss a situation in which an image contains a moving object that moves. FIG. 2 is a schematic drawing for explaining the α-blending process. As shown in FIG. 2, in the case where a part of the motion vectors (i.e., the motion vector 202 in the present example) of a moving object has an error, the level of reliability calculated for the motion vector 202 is not high. In the example shown in FIG. 2, the reference character 201 indicates motion vectors each of which does not have an error.

According to the conventional technique, in the case where the motion vectors are not reliable, a large amount of the still image is blended as the failure-preventing image. Thus, the still image is blended into a part of the moving object, and the part is viewed as an artifact 203.

To cope with this situation, the first embodiment of the present invention is not based on the assumption that "the motion vectors are not reliable, but the still image is reliable". According to the first embodiment, a level of reliability of a still image used as a failure-preventing image (i.e., a static vector reliability level) is calculated. After that, a weighted average of the motion vector reliability level and the static vector reliability level is calculated, and an interpolated frame is generated. Thus, it is possible to insert interpolated images by blending the still image according to the degree of likelihood of inserting the still image between a source frame and a destination frame.

FIG. 3 is a schematic drawing for explaining how an interpolated frame is generated according to the first embodiment. As shown in FIG. 3, in the case where it is assumed that the motion vector reliability level of the motion vector 202 having an error is approximately 0.3, the still image corresponding to approximately 0.7 (i.e., 1.0−0.3=0.7) will be blended with a motion compensated image, according to the conventional α-blending technique. Thus, a large amount of the still image will be blended, and as a result, an artifact will be viewed.

On the other hand, according to the first embodiment, a static vector reliability level indicating the level of reliability of a static vector is calculated so that the amount of the still image to be blended will not be defined based only on the motion vector reliability level. For instance, with the example shown in FIG. 3, let us discuss a situation in which the motion vector reliability level is 0.3, whereas the reliability level of the static vector is low with respect to the moving object so that the static reliability level is calculated as, for example, 0.05. According to the first embodiment, a value obtained by dividing the motion vector reliability level by a sum of the motion vector reliability level and the static vector reliability level is used as a weighting factor for a motion compensated image (i.e., the weighting factor=0.86). Also, a value obtained by dividing the static vector reliability level by a sum of the motion vector reliability level and the static vector reliability level is used as a weighting factor for the still image (i.e., the weighting factor=0.14). Accordingly, an image obtained according to a weighted average calculated by using these weighting factors will be used as an interpolated frame. Thus, even if the moving object has a motion vector having an error, it is possible to avoid generating an interpolated frame in which a larger amount of the still image than necessary is blended. As a result, according to the first embodiment, it is possible to inhibit artifacts, which are caused by blending a large amount of the still image.

Next, the details of the interpolated image generating apparatus 100 according to the first embodiment will be explained. Returning to the description of FIG. 1, the frame memory 110 is a storage medium that temporarily stores therein the source frame, the destination frame, the interpolated frames, and the like.

The motion estimating unit 101 calculates a motion vector to a block in the destination frame that is correlated with a block in the source frame. Based on the source frame and the destination frame, the motion estimating unit 101 estimates a motion between the two images in the manner described below by using a block matching method. It should be noted that, although the block matching method is used according to the first embodiment, the present invention is not limited to this example. It is acceptable to estimate the motion by using other methods such as an optical flow estimation process, the Pel-recursive method, or the Bayesian method.

In the block matching process, the source frame is divided into predetermined blocks each having a rectangular area by using Expression (1).

$$B(i)=\{i+(x,y)^T | 0 \leq x < M_1, 0 \leq y < M_2\} \quad (1)$$

POINT i∈X: POINT IN UPPER LEFT CORNER OF BLOCK $M_1$, $M_2$: x SIZE AND y SIZE OF BLOCK $X \subset \Lambda^2$: FRAME When the area in which the motion is sought for is expressed as W∈R² (where R² denotes a vector space), a block matching algorithm according to a Sum of Squared Difference (SSD) can be expressed by using Expression (2).

$$u(i) = \underset{u \in W}{\mathrm{argmin}} E(i, u) \equiv \sum_{x \in B(i)} (I_{dst}(i + (1 - \Delta t)u + x) - I_{src}(i - \Delta tu + x))^2 \quad (2)$$

$u(i) \in X$: MOTION VECTOR IN BLOCK $i$ $W \subset X$: AREA FOR WHICH MOTION IS SOUGHT FOR In Expression (2), u(i) is a motion vector, which is the movement of the block i, and argmin E(i,u) is the value of u for which E has the smallest value. According to the first embodiment, the motion vector u(i) is expressed by using the SSD as indicated in Expression (2); however, another arrangement is acceptable in which the motion vector u(i) is calculated by using a Sum of Absolute Difference (SAD) as shown in Expression (3).

$$u(i) = \underset{u \in W}{\mathrm{argmin}} E(i, u) \equiv \sum_{x \in B(i)} |I_{dst}(i + (1 - \Delta t)u + x) - I_{src}(i - \Delta tu + x)| \quad (3)$$

In Expression (3), argmin E(i,u) is the value of u for which E(i,u) has the smallest value.

The motion vector reliability calculator 102 calculates a value indicating how appropriate the motion vector u(i) is as a vector to be used for inserting an interpolated frame between the source frame and the destination frame. In other words, the motion vector reliability calculator 102 calculates a motion vector reliability level that indicates the reliability of the motion vector u(i). The stronger the correlation is between a block in the source frame and a block in the destination frame, the larger is the value of the motion vector reliability level.

In the following explanation, the motion vector is formulated in a probability model. When a source frame and a destination frame are given, the probability (i.e., the reliability level) of a motion vector can be expressed in a model by using Bayes' Theorem as shown in Expression (4).

$$Pr(u(i))|I_{src}, I_{dst}) \propto Pr(I_{dst}|I_{src}, u(i))Pr(u(i)) \quad (4)$$

The first term of the right-hand side of Expression (4) indicates the likelihood, which is the probability with which the motion vector u(i) is applicable to the image. The second term of the right-hand side of Expression (4) indicates a prior probability of the motion vector u(i), which shows the characteristics of the motion vector itself. When it is assumed that the noise included in the image is Gaussian noise, because the Displaced Pixel Difference (DPD) follows a Gaussian distribution, the likelihood can be expressed in a model as shown in Expression (5).

$$Pr(I_{dst} | I_{src}, u(i)) = \exp\left(-\frac{MSE(i, u(i))}{2\sigma_I^2}\right) \quad (5)$$

$$MSE(i, u) = \frac{1}{M_1 M_2} \sum_{x \in B(i)} (I_{dst}(i + x + (1 - \Delta t)u) - I_{src}(i + x - \Delta tu))^2$$

In Expression (5), MSE denotes a Mean Squared Error, whereas σ1 denotes the standard deviation of the noise included in the image.

When it is assumed that any motion vector u(i) is reliable, the prior probability of the motion vector u(i) can be expressed in a model as shown in Expression (6).

$$Pr(u(i))=1 \quad (6)$$

In this situation, the probability of the motion vector u(i), that is, the motion vector reliability level σ(i, u(i)), can be expressed by using Expression (7).

$$\alpha(i, u(i)) = Pr(u(i) | I_{src}, I_{dst}) = \exp\left(-\frac{MSE(i, u(i))}{2\sigma_I^2}\right) \quad (7)$$

In other words, the motion vector reliability calculator 102 calculates the motion vector reliability level α(i, u(i)) by using Expression (7).

Next, the static vector reliability calculator 103 uses a static vector (i.e., a 0-vector) as a failure-preventing vector that is a predetermined vector used for preventing image failures and calculates a static vector reliability level that indicates the reliability of the still image serving as a failure-preventing image. Because the static vector (i.e., the 0-vector) is used as the failure-preventing vector according to the first embodiment, the static vector reliability calculator 103 calculates, as the static vector reliability $\alpha(i, 0)$, a value obtained by assigning $u(i)=0$ (where 0 denotes the static vector) into Expression (7), in the same manner as the motion vector reliability level has been calculated.

Next, the image blending unit 104 obtains a motion compensated image by performing a motion compensating process based on the motion vector $u(i)$, obtains a still image for preventing image failures by performing a motion compensating process based on the static vector, and generates an interpolated frame by blending the motion compensated image and the still image according to a weighted average that has been calculated by using weighting factors based on the motion vector reliability level $\alpha(i, u(i))$ and the static vector reliability level $\alpha(i, 0)$. In the following sections, the process performed by the image blending unit 104 will be explained more specifically.

To calculate an interpolated pixel $I_{int}(x)$ in the interpolated frame in a pixel position $x \in B(i)$ within a source block i, the image blending unit 104 first generates a still pixel $Istill(x)$ by using the pixel in the source frame as it is, as shown in Expression (8-1). After that, the image blending unit 104 generates a motion compensated pixel $I_{mc}(x)$ obtained by shifting the pixel in the source frame with the motion vector $u(i)$, by using Expression (8-2).

$$I_{still}(x)=I_{src}(x) \tag{8-1}$$

$$I_{mc}(x)=I_{src}(x-\Delta tu(i)) \tag{8-2}$$

In these expressions, the still pixel $I_{still}(x)$ has the static vector reliability level $\alpha(i, 0)$, whereas the motion compensated pixel $I_{mc}(x)$ has the motion vector reliability level $\alpha(i, u(i))$. Thus, the image blending unit 104 calculates the weighted average of the still pixel $I_{still}(x)$ and the motion compensated pixel $I_{mc}(x)$ by using Expression (9) with the weighting factors based on these reliability levels and calculates the interpolated frame by blending the still pixel $I_{still}(x)$ and the motion compensated pixel $I_{mc}(x)$.

$$I_{int}(x) = \frac{\alpha(i, u(i))I_{mc}(x) + \alpha(i, 0)I_{still}(x)}{\alpha(i, u(i)) + \alpha(i, 0)} \tag{9}$$

In other words, the image blending unit 104 uses a value obtained by dividing the motion vector reliability level $\alpha(i, u(i))$ by a sum of the motion vector reliability level $\alpha(i, u(i))$ and the static vector reliability level $\alpha(i, 0)$ as the weighting factor for the motion compensated pixel $I_{mc}(x)$. Also, the image blending unit 104 uses a value obtained by dividing the static vector reliability level $\alpha(i, 0)$ by a sum of the motion vector reliability level $\alpha(i, u(i))$ and the static vector reliability level $\alpha(i, 0)$ as the weighting factor for the still pixel $I_{still}(x)$. The image blending unit 104 then calculates a pixel according to the weighted average based on the weighting factors, as the interpolated pixel $I_{int}(x)$ in the interpolated frame. The image blending unit 104 calculates an interpolated pixel $I_{int}(x)$ in this manner for each of all the pixels in the block. Further, the image blending unit 104 performs the calculating process for each of all the blocks in the source frame. As a result, the interpolated frame is generated.

In the case where both the motion vector reliability level $\alpha(i, u(i))$ and the static vector reliability level $\alpha(i, 0)$ are 0, the weighted average in Expression (9) is indeterminate. Thus, in the case where both the motion vector reliability level $\alpha(i, u(i))$ and the static vector reliability level $\alpha(i, 0)$ are 0, it is a good idea to configure the image blending unit 104 so as to calculate the interpolated pixel $I_{int}(x)$ by using Expression (10-1) or (10-2).

$$I_{int}(x)=0.5\,I_{mc}(x)+0.5\,I_{still}(x) \tag{10-1}$$

$$I_{int}(x)=I_{still}(x) \tag{10-2}$$

Next, the interpolated frame generating process according to the first embodiment that is configured as described above will be explained, with reference to FIG. 4. First, by using Expression (2), the motion estimating unit 101 estimates a motion in the block i and calculates a motion vector $u(i)$ (step S11). After that, the motion vector reliability calculator 102 calculates a motion vector reliability level $\alpha(i, u(i))$ of the motion vector $u(i)$ by using Expression (7) (step S12). Subsequently, the static vector reliability calculator 103 calculates a static vector reliability level $\alpha(i, 0)$ by assigning the static vector $u(i)=0$ into Expression (7) (step S13).

After that, the image blending unit 104 calculates a still pixel $I_{still}(x)$ in a pixel position x within the block by using Expression (8-1) (step S14) and calculates a motion compensated pixel $I_{mc}(x)$ in the pixel position x within the block i by using Expression (8-2) (step S15). Subsequently, the image blending unit 104 calculates an interpolated pixel $I_{int}(x)$ according to a weighted average calculated from Expression (9) (step S16). The process for calculating the interpolated pixel $I_{int}(x)$ at steps S14 through S16 is performed for each of all the pixels within the block i. Thus, an interpolated image is generated in units of blocks (i.e., for each block i).

Also, the series of processes at steps S11 through S16 is performed for each of all the blocks in the source frame. As a result, an interpolated frame is generated.

As explained above, the interpolated image generating apparatus 100 according to the first embodiment uses the value obtained by dividing the motion vector reliability level $\alpha(i, u(i))$ by the sum of the motion vector reliability level $\alpha(i, u(i))$ and the static vector reliability level $\alpha(i, 0)$ as the weighting factor for the motion compensated image and also uses the value obtained by dividing the static vector reliability level $\alpha(i, 0)$ by the sum of the motion vector reliability level $\alpha(i, u(i))$ and the static vector reliability level $\alpha(i, 0)$ as the weighting factor for the still image. The interpolated image generating apparatus 100 then generates the interpolated frame by blending the still image and the motion compensated image according to the weighted average calculated by using these weighting factors. Thus, even in the case where a moving object in the image has one or more motion vectors that have an error, it is possible to avoid generating an interpolated frame in which a larger amount of still image than necessary is blended. Consequently, it is possible to inhibit artifacts, which are caused by blending a large amount of the still image, and to generate an interpolated image that has high quality and is more robust.

When the motion vector reliability calculator 102 according to the first embodiment calculates the motion vector reliability level $\alpha(i, u(i))$ by using Expression (7), the prior probability of the motion vector is specified so that $Pr(u(i))=1$ is satisfied as shown in Expression (6); however, another arrangement is acceptable in which the prior probability of the motion vector is calculated by using Expression (11) so that the consecutiveness of the motion vectors $u(i)$ in a temporal direction is additionally taken into consideration.

$$Pr(u(i)) = \exp\left(-\frac{\|u(i) - u_{t-1}(i)\|_{L_2}^2}{2\sigma_{V_t}^2}\right) \quad (11)$$

$u_{t-1}(i)$: MOTION VECTOR IN IMMEDIATELY PRECEDING FRAME $\sigma_{V_t}$: STANDARD DEVIATION OF CONSECUTIVENESS OF MOTION VECTORS IN TEMPORAL DIRECTION In Expression (11), it is assumed that the motion vectors u(i) that are consecutive in a temporal direction have a high level of reliability. Also, yet another arrangement is acceptable in which the motion vector reliability calculator 102 is configured so as to calculate the prior probability Pr(u(i)) of the motion vector by using Expression (12) so that the motion vectors u(i) that are consecutive in a special direction are judged to have a high level of reliability.

$$Pr(u(i)) = \exp\left(-\frac{\sum_{s \in N}\|u(i+s) - u(i)\|_{L_2}^2}{2\sigma_{V_s}^2}\right) \quad (12)$$

$$N = \left\{\begin{bmatrix}-1\\-1\end{bmatrix}, \begin{bmatrix}0\\-1\end{bmatrix}, \begin{bmatrix}+1\\-1\end{bmatrix}, \begin{bmatrix}-1\\0\end{bmatrix}, \begin{bmatrix}+1\\0\end{bmatrix}, \begin{bmatrix}-1\\+1\end{bmatrix}, \begin{bmatrix}0\\+1\end{bmatrix}, \begin{bmatrix}+1\\+1\end{bmatrix}\right\}$$

$\sigma_{V_s}$: STANDARD DEVIATION OF CONSECUTIVENESS OF MOTION VECTORS IN SPATIAL DIRECTION Further, yet another arrangement is acceptable in which the motion vector reliability calculator 102 is configured so as to calculate the prior probability Pr(u(i)) of the motion vector by using Expression (13), so as to use both Expressions (11) and (12).

$$Pr(u(i)) = \exp\left(-\frac{\sum_{s \in N}\|u(i+s) - u(i)\|_{L_2}^2}{2\sigma_{V_s}^2}\right)\exp\left(-\frac{\|u(i) - u_{t-1}(i)\|_{L_2}^2}{2\sigma_{V_t}^2}\right) \quad (13)$$

In the case where the prior probability Pr(u(i)) of the motion vector is calculated as shown in any of Expressions (11) to (13), the motion vector reliability calculator 102 calculates the motion vector reliability level α(i, u(i)) by using Expression (14).

$$\alpha(i, u(i)) = Pr(u(i) \mid I_{src}, I_{dst})Pr(u(i)) = \quad (14)$$
$$\exp\left(-\frac{MSE(i, u(i))^2}{2\sigma_I^2}\right)\exp\left(-\frac{\|u(i) - u_{t-1}(i)\|_{L_2}^2}{2\sigma_{V_t}^2}\right)$$

Further, yet another arrangement is acceptable in which the motion vector reliability calculator 102 calculates the motion vector reliability level α(i, u(i)) as shown in Expression (15) by using an inverse. In this situation, L1-Norm is used as shown in Expression (15).

$$\alpha(i, u(i)) = \frac{1}{MAD(i, u(i)) + \varepsilon} \quad (15)$$

$$MAD(i, u) = \frac{1}{M_1 M_2}\sum_{x \in B(i)}|I_{dst}(i + x + (1 - \Delta t)u) - I_{src}(i + x - \Delta t u)|$$

In Expression (15), MAD denotes a Mean Absolute Difference, whereas ε(>0) denotes a safe constant used for avoiding divisions by zero.

Furthermore, yet another arrangement is acceptable in which the motion vector reliability calculator 102 is configured so as to calculate the motion vector reliability level α(i, u(i)) by using Expression (16) so that the consecutiveness of the motion vectors in a temporal direction is taken into consideration $$\alpha(i, u(i)) = \frac{1}{MAD(i, u(i)) + \gamma\|u(i) - u_{t-1}(i)\|_{L_1} + \varepsilon} \quad (16)$$

In Expression (16), γ(>0) is a parameter indicating how much weight is given to the consecutiveness in the temporal direction.

Further, another arrangement is acceptable in which the motion vector reliability calculator 102 is configured so as to calculate the motion vector reliability level α(i, u(i)) by using Expression (17) so that the consecutiveness in a spatial direction is taken into consideration.

$$\alpha(i, u(i)) = \frac{1}{MAD(i, u(i)) + \gamma\|u(i) - u_{t-1}(i)\|_{L_1} + \eta\sum_{s \in N}\|u(i+s) - u(i)\|_{L_1} + \varepsilon} \quad (17)$$

In Expression (17), η (>0) is a parameter indicating how much weight is given to the consecutiveness in the spatial direction.

The image blending unit 104 according to the first embodiment uses the pixel of the image $I_{src}$ in the source frame as the still pixel $I_{still}(x)$, as shown in Expression (8-1); however, another arrangement is acceptable in which the image blending unit 104 is configured so as to calculate the still pixel $I_{still}(x)$ by using an average pixel of the pixel $I_{src}$ in the source frame and the pixel $I_{dst}$ in the destination frame, as shown in Expression (18-1).

Similarly, as shown in Expression (18-2), another arrangement is acceptable in which the image blending unit 104 is configured so as to calculate the motion compensated pixel by using an average pixel of the pixel $I_{src}$ in the source frame and the pixel $I_{dst}$ in the destination frame.

$$I_{still}(x) = (1 - \Delta t)I_{src}(x) + \Delta t I_{dst}(x) \quad (18\text{-}1)$$

$$I_{mc}(x) = (1 - \Delta t)I_{src}(x - \Delta t u(i)) + \Delta t I_{dst}(x + (1 - \Delta t)u(i)) \quad (18\text{-}2)$$

Next, a second embodiment of the present invention will be explained. According to the first embodiment, the weighted average of the still image and the motion compensated image is calculated by using the weighting factors based on the motion vector reliability level α(i, u(i)) and the static vector reliability level α(i, 0), so that the interpolated frame is generated by blending the still image and the motion compensated image according to the calculated weighted average. According to this method, however, in the case where the value of the motion vector reliability level α(i, u(i)) and the value of the static vector reliability level α(i, 0) are close to each other, the still image and the motion compensated image will be blended with a ratio of 1 to 1. When the images are blended with a ratio of 1 to 1, it is often the case that the image does not have high quality and that it is difficult to perform the interpolating process.

To cope with this situation, an interpolated image generating apparatus according to the second embodiment calculates a reliability ratio between the motion vector reliability level α(i, u(i)) and the static vector reliability level α(i, 0) and performs a correcting process in such a manner that the closer the reliability ratio is to 1, the higher is the degree with which the reliability levels are corrected, so that it is possible to prevent the image quality from being degraded by the blending process performed with a 1-to-1 ratio.

Figure 5:
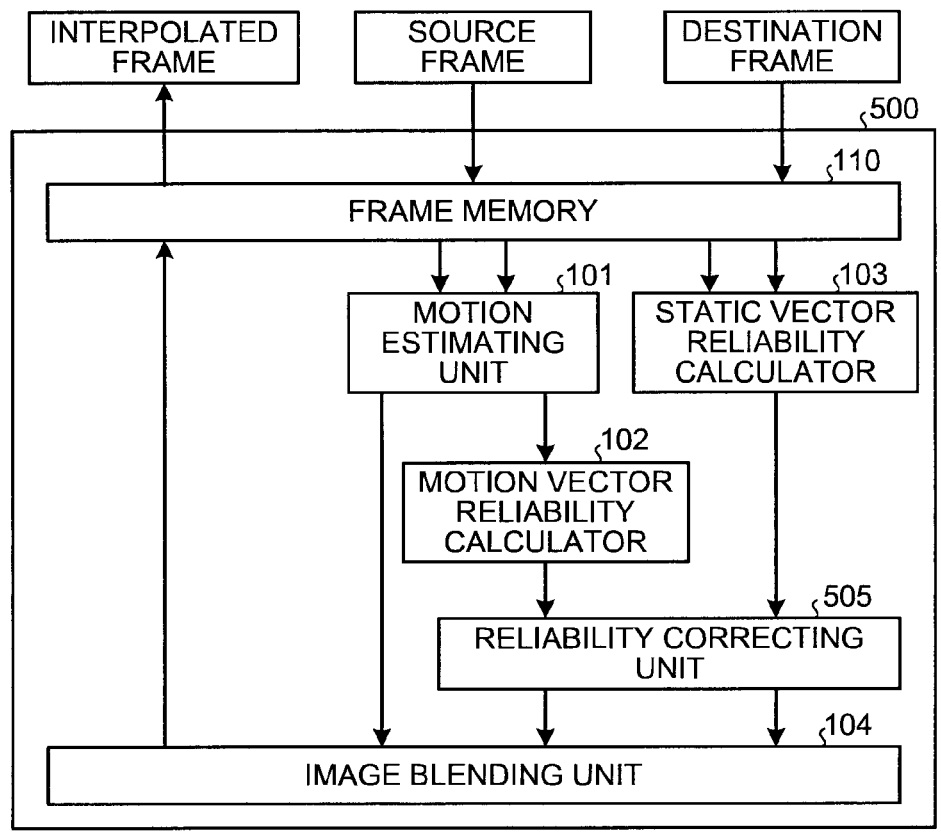
FIG. 5 is a functional block diagram of an interpolated image generating apparatus according to a second embodiment of the present invention.

As shown in FIG. 5, an interpolated image generating apparatus 500 according to the second embodiment includes: the motion estimating unit 101; the motion vector reliability calculator 102; the static vector reliability calculator 103; a reliability correcting unit 505; the image blending unit 104; and the frame memory 110. The motion estimating unit 101, the motion vector reliability calculator 102, the static vector reliability calculator 103, the image blending unit 104, and the frame memory 110 have the same functions as those according to the first embodiment, respectively.

The reliability correcting unit 505 calculates a reliability ratio that is a ratio between the motion vector reliability level α(i, u(i)) and the static vector reliability level α(i, 0). The reliability correcting unit 505 then corrects these reliability levels in such a manner that the closer the reliability ratio is to 1, the smaller the motion vector reliability level α(i, u(i)) becomes and the larger the static vector reliability level α(i, 0) becomes. More specifically, the reliability correcting unit 505 calculates the reliability ratio r(i) by using Expression (19).

$$r(i) = \begin{cases} \dfrac{\alpha(i, u(i))}{\alpha(i, 0)} & \text{if } \alpha(i, u(i)) > \alpha(i, 0) \\ \dfrac{\alpha(i, 0)}{\alpha(i, u(i))} & \text{otherwise} \end{cases} \quad (19)$$

Expression (19) is arranged so that the reliability ratio r(i) calculated from the value of the motion vector reliability level α(i, u(i)) and the value of the static vector reliability level α(i, 0) satisfies r(i)≧1. If the reliability ratio r(i) is close to 1, it means that an interpolated image will be generated by blending substantially equal amounts of a motion compensated image and a still image. Such an interpolated image does not have high quality, as mentioned above. To cope with this situation, according to the second embodiment, the two reliability levels are corrected in such a manner that the closer the reliability ratio r(i) is to 1, the more the static vector u(i)=0 is used in the blending process rather than the motion vector u(i), so that an interpolated image having high quality can be generated.

Accordingly, by using Expression (20), an absolute reliability level $\alpha_r(i)$ is defined by the reliability correcting unit 505 according to the second embodiment in such a manner that the closer the reliability ratio r(i) is to 1, the smaller the value of the absolute reliability level $\alpha_r(i)$ becomes.

$$\alpha_r(i) = 1 - \exp\left(-\frac{(r(i) - 1)^2}{2\sigma^2}\right) \quad (20)$$

Figure 6:
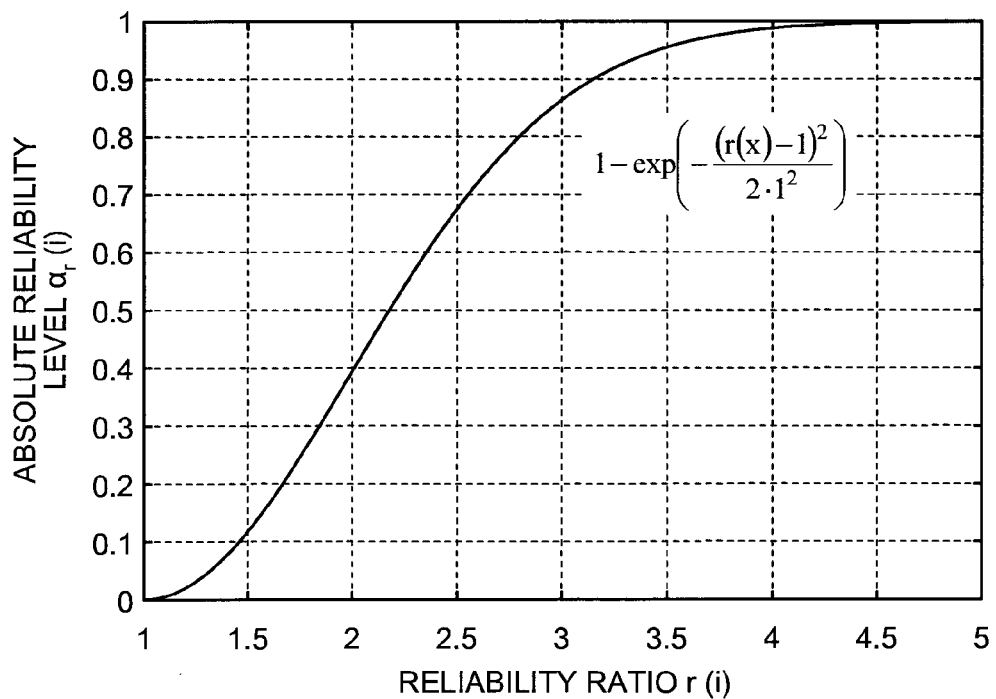
FIG. 6 is a chart for explaining an absolute reliability curve corresponding to the case where the standard deviation σ satisfies σ=1.

In Expression (20), σ (>0) denotes the standard deviation of the absolute reliability level. It means that the larger the value of σ is, the larger the value of the reliability ratio r(i) needs to be to prove the reliability thereof. FIG. 6 is a chart for explaining an absolute reliability curve corresponding to the case where the standard deviation σ satisfies σ=1. In this manner, the reliability correcting unit 505 calculates the absolute reliability level $\alpha_r(i)$ by using Expression (20).

After that, the reliability correcting unit 505 corrects the motion vector reliability level α(i, u(i)) and the static vector reliability level α(i, 0), by using the absolute reliability level $\alpha_r(i)$ calculated from Expression (20).

In this situation, in the case where a weighted average is calculated by using only the static vector, the corrected motion vector reliability level will be expressed as $\alpha_p(i, u(i))$, whereas the corrected static vector reliability level will be expressed as $\alpha_p(i, 0)$, as shown in Expression (21).

$$\alpha_p(i, u(i)) = 0$$

$$\alpha_p(i, 0) = \alpha(i, u(i)) + \alpha(i, 0) \quad (21)$$

Accordingly, as shown in Expression (22), the reliability correcting unit 505 calculates a corrected motion vector reliability level α'(i, u(i)) and a corrected static vector reliability level α'(i, 0), by performing the conventional α-blending process by using $\alpha_p(i, u(i))$ and $\alpha_p(i, 0)$ that are shown in Expression (21) as well as the pre-correction motion vector reliability level α(i, u(i)), the pre-correction static vector reliability level α(i, 0), and the absolute reliability level $\alpha_r(i)$.

$$\alpha'(i, u(i)) = \alpha_r(i)\alpha(i, u(i)) + (1 - \alpha_r(i))\alpha_p(i, u(i)) = \alpha_r(i)\alpha(i, u(i)) \quad (22)$$

$$\alpha'(i, 0) = \alpha_r(i)\alpha(i, 0) + (1 - \alpha_r(i))\alpha_p(i, 0) =$$

$$\alpha_r(i)\alpha(i, 0) + (1 - \alpha_r(i))\{\alpha(i, u(i)) + \alpha(i, 0)\}$$

By using Expression (9) explained in the first embodiment, the image blending unit 104 calculates an interpolated pixel by using the corrected motion vector reliability level α'(i, u(i)) and the corrected static vector reliability level α'(i, 0) that have been calculated from Expression (22). In other words, the image blending unit 104 calculates an interpolated pixel $I_{int}$ by assigning the corrected motion vector reliability level α'(i, u(i)) into α(i, u(i)) in Expression (9) and assigning the corrected static vector reliability level α'(i, 0) into α(i, 0) in Expression (9).

Figure 7:
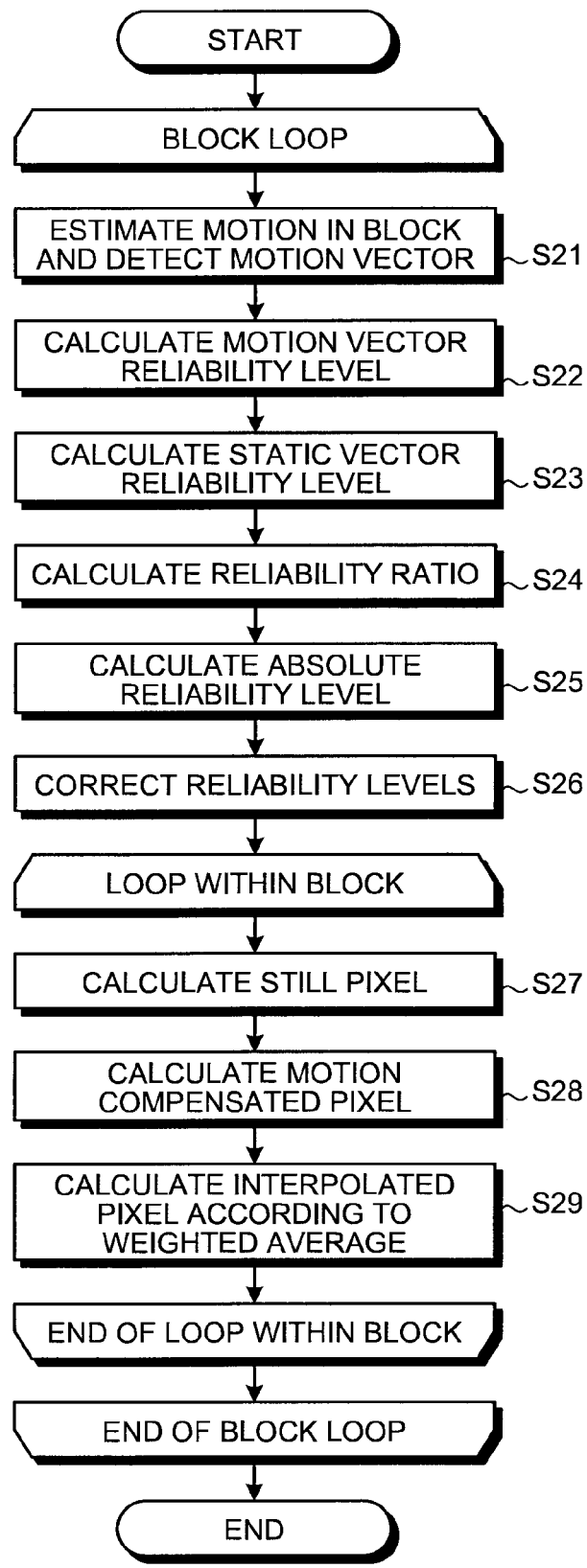
FIG. 7 is a flowchart of a procedure in an interpolated frame generating process according to the second embodiment.

Next, the interpolated frame generating process according to the second embodiment that is configured as described above will be explained, with reference to FIG. 7. The motion estimating process (step S21), the motion vector reliability calculating process (step S22), and the static vector reliability calculating process (step S23) are performed in the same manner as in the first embodiment.

When the motion vector reliability level α(i, u(i)) and the static vector reliability level α(i, 0) have been calculated, the reliability correcting unit 505 calculates a reliability ratio r(i) indicating the ratio between these two reliability levels by using Expression (19) (step S24). After that, by using Expression (20), the reliability correcting unit 505 calculates an absolute reliability level $\alpha_r(i)$ by using the calculated reliability ratio r(i) (step S25).

Subsequently, the reliability correcting unit 505 calculates a corrected motion vector reliability level α'(i, u(i)) and a corrected static vector reliability level α'(i, 0) by correcting the pre-correction motion vector reliability level α(i, u(i)) and the pre-correction static vector reliability level α(i, 0) by using Expressions (21) and (22) (step S26).

The processes thereafter are performed in the same manner as in the first embodiment. As described above, when the interpolated image is generated, the corrected motion vector reliability level α'(i, u(i)) and the corrected static vector reliability level α'(i, 0) are used in Expression (9).

As explained above, the interpolated image generating apparatus 500 according to the second embodiment calculates the reliability ratio between the motion vector reliability level α(i, u(i)) and the static vector reliability level α(i, 0) and, in the case where the calculated reliability ratio is close to 1, the interpolated image generating apparatus 500 corrects these two reliability levels. The interpolated image generating apparatus 500 then generates the interpolated image by blending the motion compensated image and the still image according to the weighted average calculated by using the corrected reliability levels. Thus, it is possible to prevent the quality of the interpolated image from being degraded by blending the motion compensated image and the still image with a 1-to-1.

According to the second embodiment, the reliability correcting unit 505 calculates the absolute reliability level $α_r(i)$ by using Expression (20); however, the present invention is not limited to this example.

In other words, in the case where the absolute values of the motion vector reliability level α(i, u(i)) and the static vector reliability level α(i, 0) are small, the values of the reliability levels themselves are not reliable. Thus, when a weighted average is calculated with Expression (9) by using such motion vector reliability level α(i, u(i)) and static vector reliability level α(i, 0), the result will not be very reliable, and it is not possible to generate an interpolated image having high quality.

In such a situation, to prevent the image quality from being degraded, it is better to generate an interpolated image by performing the blending process using a static vector. Thus, another arrangement is acceptable in which the reliability correcting unit 505 is configured so as to define an absolute reliability level indicating that, in the case where the larger of the motion vector reliability level α(i, u(i)) and the static vector reliability level α(i, 0) is smaller than a predetermined threshold value, those reliability levels are not reliable, by using a logistic function as shown in expression (23), and to calculate an absolute reliability level $α_r(i)$ by using Expression (23).

$$α_r(i) = \frac{1}{1 + \exp(-γ_1(\max\{α(i, u(i)), α(i, 0)\} - γ_2))} \quad (23)$$

$γ_1 > 0$: SLOPE OF CURVE LINE, $γ_2 > 0$: INFLECTION POINT OF CURVE LINE

Figure 8:
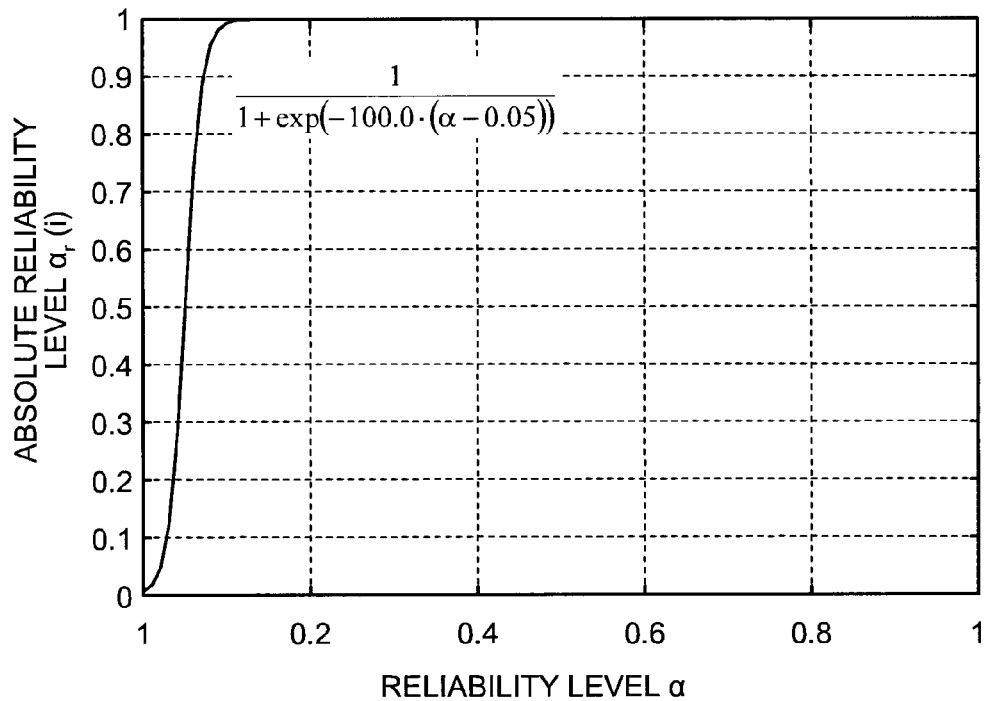
FIG. 8 is a chart for explaining an absolute reliability curve corresponding to the case where $\gamma_1=100$ and $\gamma_2=0.05$ are satisfied.

In Expression (23), $γ_1$ (>0) denotes the slope of the curve line, whereas $γ_2$ (>0) denotes the inflection point of the curve line. FIG. 8 is a chart for explaining an absolute reliability curve corresponding to the case where $γ_1=100$ and $γ_2=0.05$ are satisfied.

Another arrangement is acceptable in which the reliability correcting unit 505 is configured so as to calculate an absolute reliability level $α_r(i)$ by using Expression (24) in which both Expressions (20) and (23) are put together.

$$α_r(i) = \left\{1 - \exp\left(-\frac{(r(i)-1)^2}{2σ^2}\right)\right\} \frac{1}{1 + \exp(-γ_1(\max\{α(i, u(i)), α(i, 0)\} - γ_2))} \quad (24)$$

Next, a third embodiment of the present invention will be explained. The interpolated image generating apparatus 100 according to the first embodiment generates the interpolated frame by calculating the weighted average in units of the blocks that are in the source frame and the destination frame. According to this method by which the interpolated frame is generated in units of blocks, however, there is a possibility that a block distortion may be caused.

To cope with this situation, according to the third embodiment, a motion vector reliability level α(i, u(i)) and a static vector reliability level α(i, 0) are calculated in units of pixels, and an interpolated image is generated by calculating a weighted average of the motion compensated image and the still image in units of pixels according to weighting factors based on the motion vector reliability level α(i, u(i)) and the static vector reliability level α(i, 0).

Figure 9:
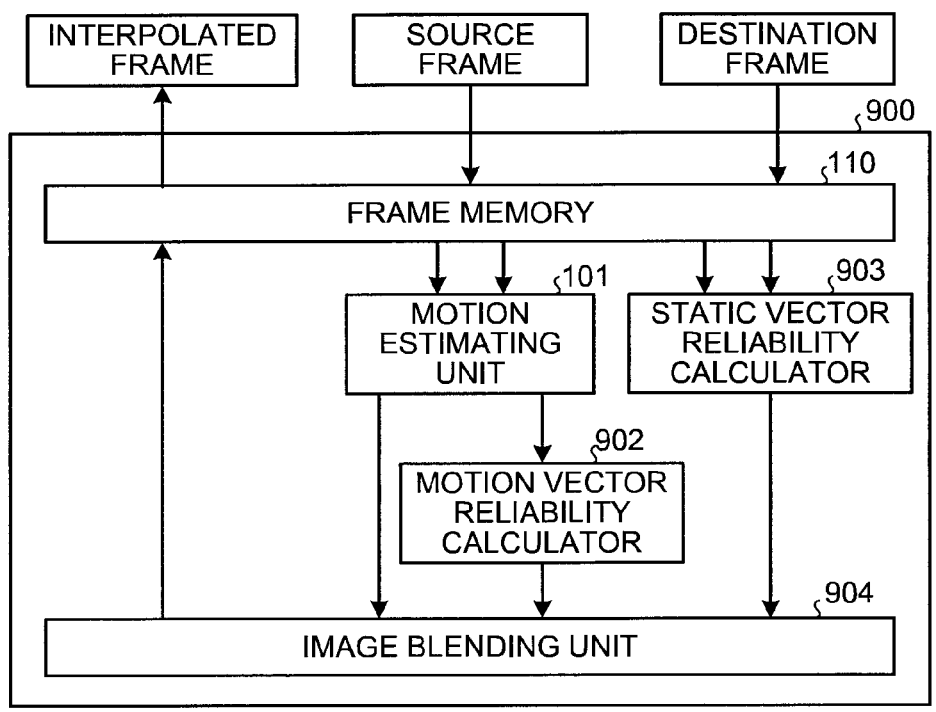
FIG. 9 is a functional block diagram of an interpolated image generating apparatus according to a third embodiment of the present invention.

As shown in FIG. 9, an interpolated image generating apparatus 900 according to the third embodiment includes: the motion estimating unit 101; a motion vector reliability calculator 902; a static vector reliability calculator 903; an image blending unit 904; and the frame memory 110. The motion estimating unit 101 and the frame memory 110 have the same functions as those according to the first embodiment, respectively.

Figure 10:
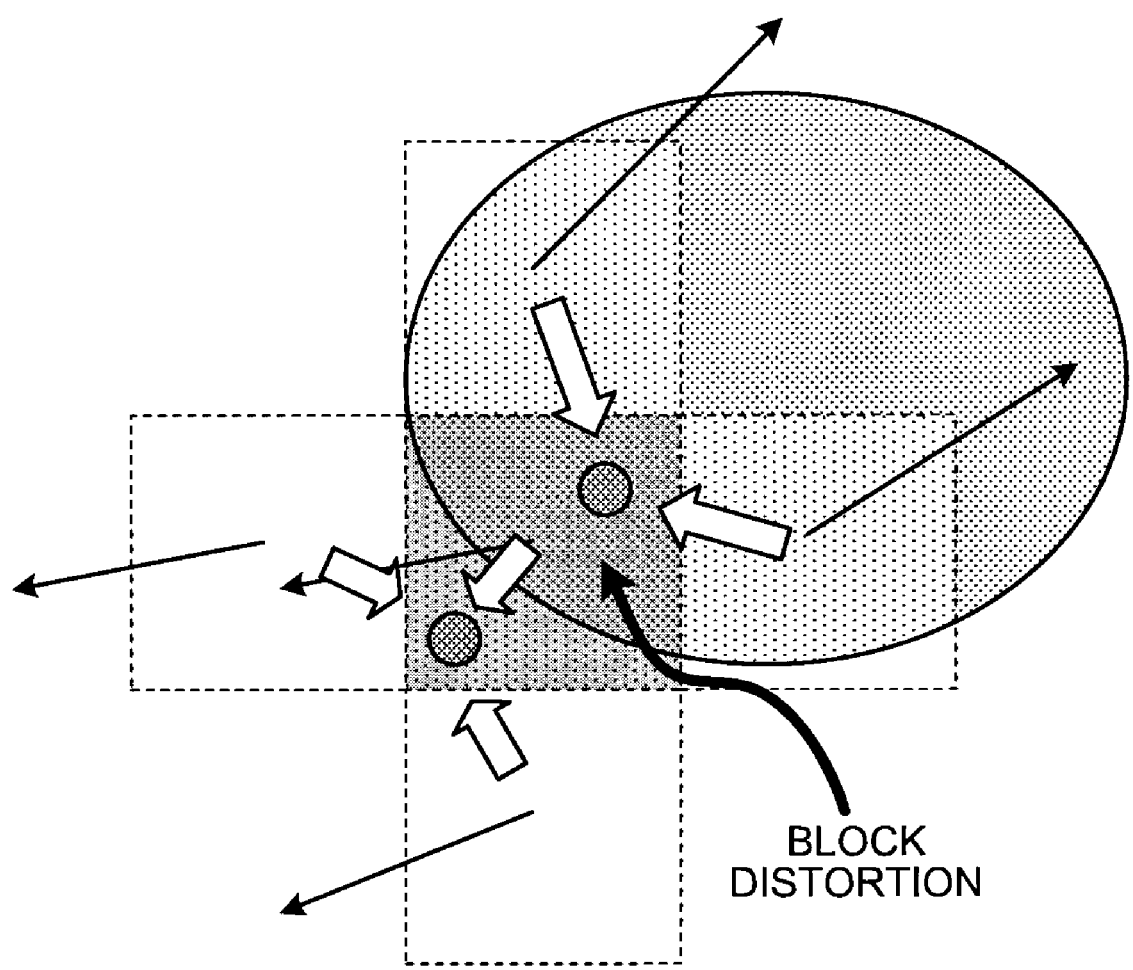
FIG. 10 is a schematic drawing of an overview of how an interpolated image is generated according to the third embodiment.

According to the third embodiment, to inhibit block distortions, a motion vector reliability level α(i, u(i)) and a static vector reliability level α(i, 0) are calculated in units of pixels. FIG. 10 is a schematic drawing of an overview of how an interpolated image is generated according to the third embodiment.

As shown in FIG. 10, when a focus is placed on a block that includes a border of two objects in an image, generally speaking, the motions of the pixels that belong to either one of the objects are present in surrounding blocks. Thus, it is possible to generate an interpolated frame having no block distortion by calculating the motion vector reliability level α(i, u(i)) and the static vector reliability level α(i, 0) in units of pixels while the motion vectors for the blocks (hereinafter, "surrounding blocks") that are in the surroundings of the source block are taken into consideration, so that a weighted average of the motion compensated pixels is calculated based on the motion vectors in the surrounding blocks according to the calculated reliability levels.

Next, a process that is performed with respect to a pixel position x within a source block i will be explained. A set of surrounding vectors for the source block i can be expressed by using Expression (25). In this situation, the surrounding vectors for the source block i denote a motion vector for the source block and motion vectors for the surrounding blocks of the source block.

$$U(i) = \quad (25)$$

$$\{u(i), u(i + (-1, 0)^T), u(i + (1, 0)^T), u(i + (0, -1)^T), u(i + (0, 1)^T)\}$$

According to the third embodiment, the surrounding blocks denote five blocks in total that are namely the source block i and the four blocks that are positioned above, below, to the left, and to the right of the source block i. The motion vectors for these five blocks are used as surrounding vectors, which are the motion vectors for the surrounding blocks. It should be noted, however, that the surrounding vectors are not limited to the ones in the present example. For example, another arrangement is acceptable in which the surrounding blocks are the areas corresponding to nine blocks in total that include the blocks that are positioned in the diagonal directions from the source block, in addition to the blocks that are positioned above, below, to the left, and to the right of the source block, so that the motion vectors for these nine blocks are used as the surrounding vectors.

The motion vector reliability calculator 902 calculates a motion vector reliability level in units of pixels for the motion vectors including the surrounding vectors. More specifically, by using Expression (26), the motion vector reliability calculator 902 calculates a motion vector reliability level $\alpha(x, u)$ in the pixel position x for each of the surrounding vectors $u \in U(i)$.

$$\alpha(x, u) = \exp\left(-\frac{DPD(x, u)^2}{2\sigma_f^2}\right) \quad (26)$$

$$DPD(x, u) = I_{dst}(x + (1 - \Delta t)u) - I_{src}(x - \Delta tu)$$

$u \in U(i)$: SURROUNDING VECTOR, $x$: PIXEL POSITION $DPD$: Displaced Pixel Difference (MOTION VECTOR DISPLACEMENT DIFFERENCE

WITH RESPECT TO PIXEL)

Another arrangement is acceptable in which, like in the first embodiment, the motion vector reliability level $\alpha(x, u)$ in the pixel position x is calculated by using a prior probability of the motion vector.

Yet another arrangement is acceptable in which the motion vector reliability calculator 902 is configured so as to calculate the motion vector reliability level $\alpha(x, u)$ in the pixel position x with an inverse, by using Expression (27).

$$\alpha(x, u) = \frac{1}{|DPD(x, u)| + \varepsilon} \quad (27)$$

$\varepsilon > 0$: SAFE CONSTANT USED FOR AVOIDING DIVISIONS BY ZERO

The static vector reliability calculator 903 calculates a motion vector reliability level of a static vector in units of pixels. More specifically, the static vector reliability calculator 903 calculates a static vector reliability level $\alpha(x, 0)$ by assigning the static vector u=0 into Expression (26).

The image blending unit 904 determines an interpolated pixel according to a weighted average of a motion compensated pixel and a still pixel that has been calculated by using weighting factors based on the motion vector reliability level in units of pixels and the static vector reliability level in units of pixels including the surrounding vectors. The image blending unit 904 then generates an interpolated frame by performing this process for each of all the pixels in the frame.

More specifically, the image blending unit 904 calculates a motion compensated pixel $I_{mc}(x, u)$ for each of the surrounding vectors $u \in U(i)$ by using Expression (28-1) and calculates a still pixel $I_{still}(x)$ by using Expression (28-2). Another arrangement is acceptable in which the image blending unit 904 calculates a motion compensated pixel and a still pixel by using an average pixel, like in the modification example of the first embodiment.

$$I_{mc}(x,u) = I_{src}(x - \Delta tu) \quad (28-1)$$

$$I_{still}(x) = I_{src}(x) \quad (28-2)$$

After that, the image blending unit 904 calculates an interpolated pixel $I_{int}(x)$ by using Expression (29).

$$I_{int}(x) = \frac{\left\{\sum_{u \in U(i)} \alpha(x, u) I_{mc}(x, u)\right\} + \alpha(x, 0) I_{still}(x)}{\left\{\sum_{u \in U(i)} \alpha(x, u)\right\} + \alpha(x, 0)} \quad (29)$$

Figure 11:
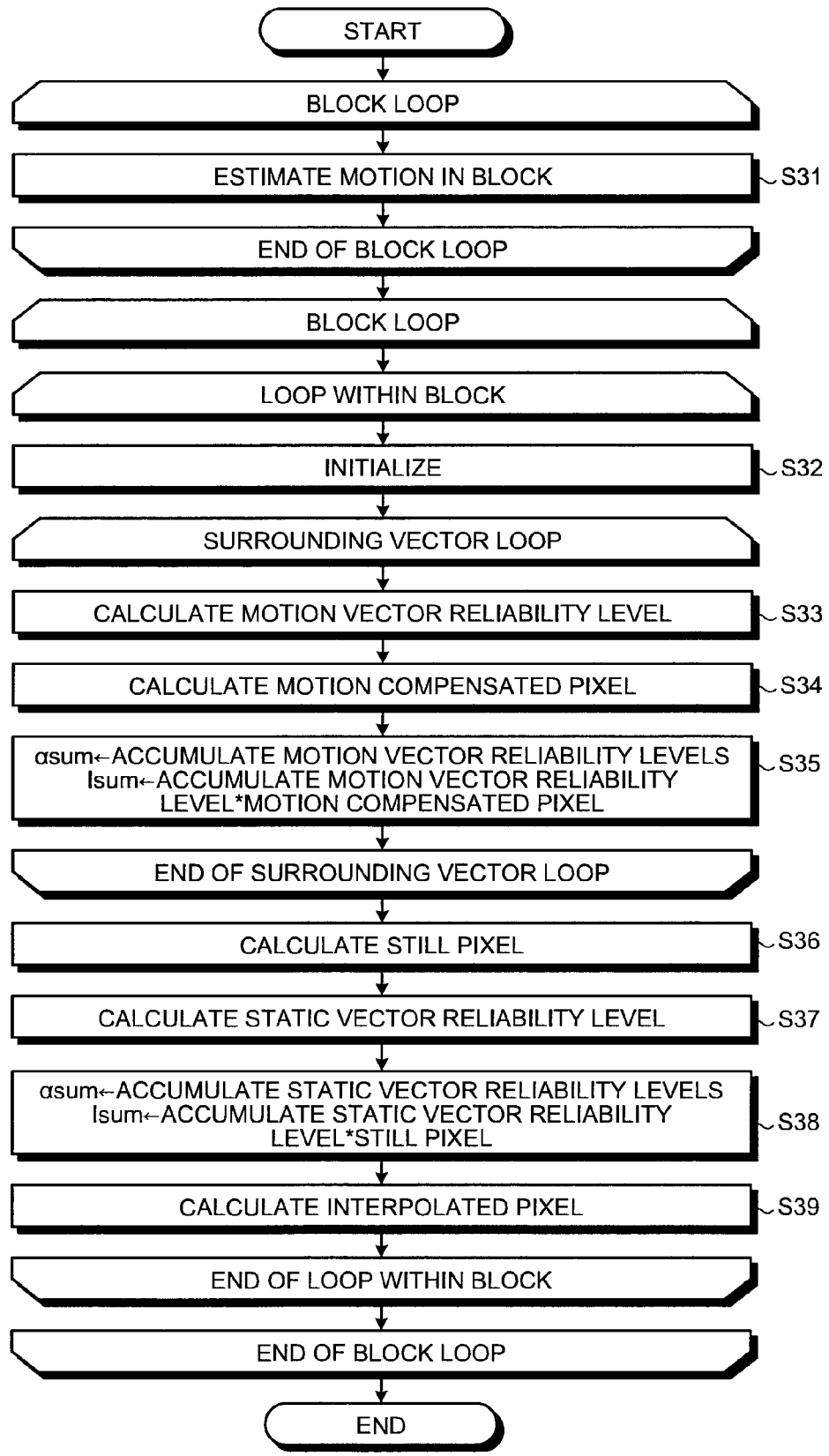
FIG. 11 is a flowchart of a procedure in an interpolated image generating process according to the third embodiment.

Next, the interpolated image generating process according to the third embodiment that is configured as described above will be explained, with reference to FIG. 11. First, the motion estimating unit 101 estimates a motion in the block i and detects motion vectors including the surrounding vectors (step S31). This process is repeatedly performed for each of all the blocks.

After that, the variables and the like are initialized (step S32). The motion vector reliability calculator 902 then calculates a motion vector reliability level $\alpha(x, u)$ in units of pixels by using Expression (26) (step S33). The image blending unit 904 calculates a motion compensated image $I_{mc}(x, u)$ by using Expression (28-1) (step S34). Subsequently, the image blending unit 904 causes the motion vector reliability level $\alpha(x, u)$ that has been calculated in units of pixels to be accumulated with an accumulated value αsum from the last time of the same process. The image blending unit 904 further multiplies the motion vector reliability level $\alpha(x, u)$ that has been calculated in units of pixels by the motion compensated pixel $I_{mc}(x, u)$ and causes the result of the multiplication to be accumulated with an accumulated value Isum from the last time of the same process (step S35). After that, the processes at steps S33 through S35 are repeatedly performed as many times as the number of surrounding vectors.

Subsequently, the image blending unit 904 calculates a still image $I_{still}(x)$ by using Expression (28-1) (step S36). The static vector reliability calculator 903 calculates a static vector reliability level $\alpha(x, 0)$ in units of pixels by assigning a static vector u=0 into Expression (26) (step S37). After that, the image blending unit 904 causes the static vector reliability level $\alpha(x, 0)$ that has been calculated in units of pixels to be accumulated with the accumulated value αsum. The image blending unit 904 further multiplies the static vector reliability level $\alpha(x, 0)$ that has been calculated in units of pixels by the still image $I_{still}(x)$ and causes the result of the multiplication to be accumulated with the accumulated value Isum (step S38). Subsequently, the image blending unit 904 calculates an interpolated pixel $I_{int}(x)$ by dividing the accumulated value Isum by the accumulated value αsum (step S39). As a result, an interpolated pixel $I_{int}(x)$ has been calculated by using Expression (29).

The processes at steps S32 through S39 are repeated performed for each of all the pixels in a block and for each of all the blocks. As a result, an interpolated frame is generated.

As explained above, the interpolated image generating apparatus 900 according to the third embodiment calculates the motion vector reliability level α(i, u(i)) and the static vector reliability level α(i, 0) in units of pixels and generates the interpolated frame by calculating, in units of pixels, the weighted average of the motion compensated image and the still image according to the weighting factors based on the motion vector reliability level α(i, u(i)) and the static vector reliability level α(i, 0). Thus, it is possible to generate an interpolated image that has no block distortions and has high quality.

Next, a fourth embodiment of the present invention will be explained. Each of the interpolated image generating apparatuses according to the first to the third embodiments generates the interpolated image by calculating the static vector reliability level as a failure-preventing vector reliability level, while using the static vector u=0 as a failure-preventing vector. However, it is acceptable to use an element other than the static vector as a failure-preventing vector.

According to the fourth embodiment, a global motion that reflects a motion in the entire screen is used as a failure-preventing vector, and a global motion reliability level is calculated as a failure-preventing vector reliability level. Further, an interpolated image is generated according to a weighted average that has been calculated by using the global motion reliability level.

Figure 12:
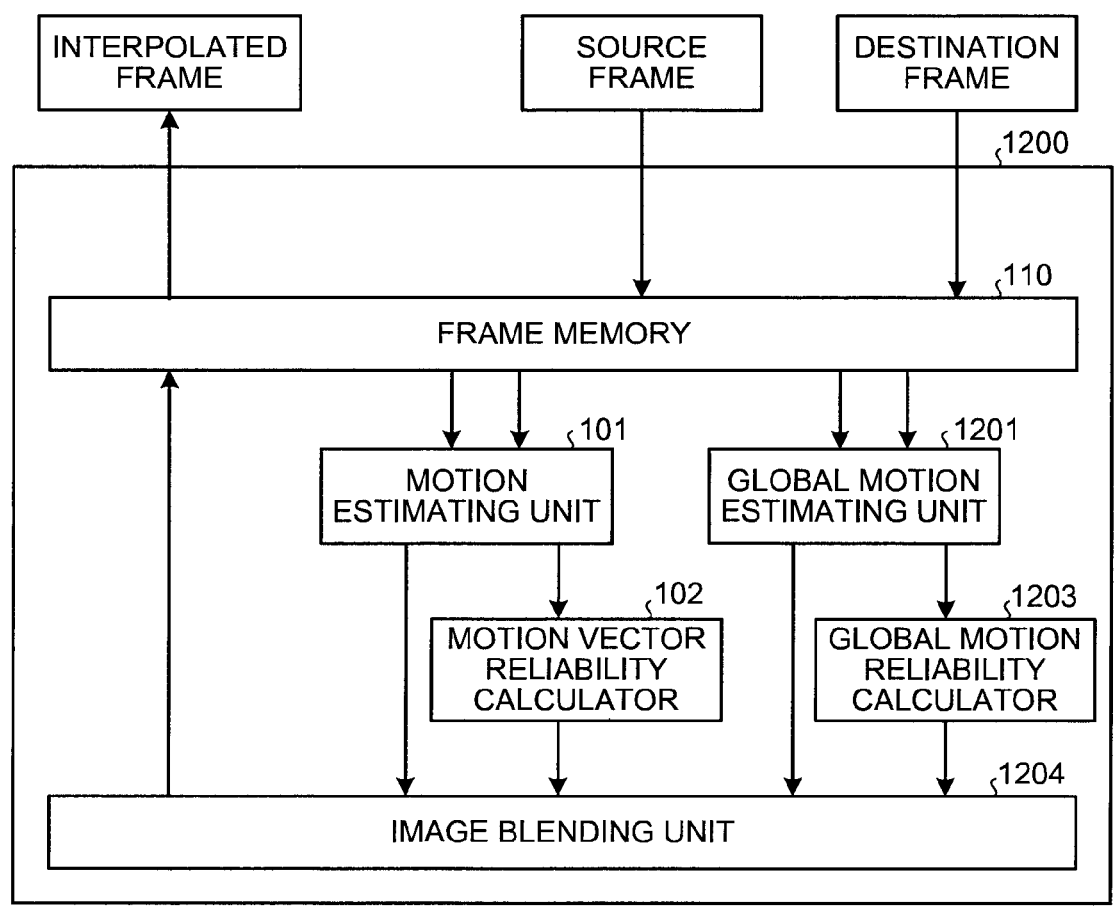
FIG. 12 is a functional block diagram of an interpolated image generating apparatus according to a fourth embodiment of the present invention.

As shown in FIG. 12, an interpolated image generating apparatus 1200 according to the fourth embodiment includes: the motion estimating unit 101; a global motion estimating unit 1201; the motion vector reliability calculator 102; a global motion reliability calculator 1203; an image blending unit 1204; and the frame memory 110. The motion estimating unit 101, the motion vector reliability calculator 102, and the frame memory 110 have the same functions as those according to the first embodiment, respectively.

The global motion estimating unit 1201 estimates a global motion based on motion vectors. It is possible to express the global motion in a model by performing a geometric transformation from a two-dimensional plane to another two-dimensional plane. A typical example of geometric transformations is an affine transformation, which is able to express translations, rotations, magnifications, and shear transformations (i.e., transformations from a square to a rhombus). The degree of freedom of the geometric transformation that is used the most is six, and it is therefore complicated. Thus, according to the fourth embodiment, geometric transformations in which only translations are taken into consideration are used. A geometric transformation in which only translations are taken into consideration can be expressed by using Expression (30). This geometric transformation can be expressed by using a single two-dimensional motion vector, and the degree of freedom thereof is two.

$$\bar{u} = (u, v)^T \tag{30}$$

The global motion estimating unit 1201 estimates the global motion by determining a motion vector (i.e., a representative motion vector) that serves as a representative of a predetermined area. The global motion estimating unit 1201 calculates the representative motion vector by using an average value or a median value.

By using the k-means method, it is possible to find a solution to a problem where an arbitrary number (i.e., K) of global motions (cf. Expression (31)) should be extracted from a given motion vector area.

$$\bar{u}_k, k=1, \Lambda, K \tag{31}$$

The k-means method employs an algorithm used for performing a clustering process on areas so as to obtain as many clusters as K. To identify a cluster to which each of the motion vectors u(i) belongs, a label z(i) is assigned to each of the motion vectors u(i). When an initial label $z^{(0)}(i)$ is assigned to each of the clusters, an average value of each of the clusters can be calculated by using Expression (32).

$$\bar{u}_k^{(t)} = \frac{\sum_{u \in U_k^{(t)}} u}{Num(U_k^{(t)})} \tag{32}$$

$$U_k^{(t)} = \{u(i) \mid z^{(t)}(i) = k, \forall i \in \Lambda^2\}$$

INITIAL LABEL: $z^{(0)}(i), \forall i \in \Lambda^2$

*Num*( ): OPERATOR USED FOR COUNTING NUMBER OF ELEMENTS,

*t*: ITERATION

After that, the cluster to which the distance from the average value is the smallest is determined, and the label thereof is updated by using Expression (33).

$$z^{(t+1)}(i) = \arg\min_{k \in \{1, \Lambda, K\}} \left\| \bar{u}_k^{(t)} - u(i) \right\|_L \tag{33}$$

According to the k-means method, the calculating process using Expressions (32) and (33) is repeatedly performed an arbitrary number of times so that the result is converged. There are various methods for assigning the initial label $z^{(0)}(i)$. For example, it is possible to assign k=1, 2, ... K in a random manner. The global motion estimating unit 1201 according to the fourth embodiment uses the initial label $z^{(0)}(i)$ for the result of the clustering process performed on source frames according to the k-means method.

The global motion estimating unit 1201 calculates an average value of the pixel values in a block of the image in the source frame by using Expression (34-1).

After that, the global motion estimating unit 1201 specifies an initial value of the average value of each of the clusters (cf. Expression (34-2)) in an arbitrary manner, for example, as a value obtained by dividing 0-255 by K pieces.

$$\bar{I}_{src}(i) = \frac{1}{Num(B(i))} \sum_{x \in B(i)} I_{src}(x) \tag{34-1}$$

INITIAL VALUE OF AVERAGE VALUE (34-2)

OF EACH OF CLUSTERS: $\bar{I}_k^{(0)}, k = 1, \Lambda, K$

Subsequently, the global motion estimating unit 1201 performs a labeling process and updates the labels by using Expression (35).

$$z_{src}^{(t)}(i) = \arg\min_{k \in \{1, \Lambda, K\}} \left\| \bar{I}_k^{(t)} - \bar{I}_{src}(i) \right\|_L \tag{35}$$

After that, the global motion estimating unit 1201 calculates an average value of the pixel values of the source frames in each of the clusters, by using Expression (36).

$$I_k^{(t+1)} = \frac{\sum_{I \in I_k^{(t)}} I}{Num(I_k^{(t)})} \tag{36}$$

$$I_k^{(t)} = \{\bar{I}_{src}(i) \mid z_{src}^{(t)}(i) = k, \forall i \in \Lambda^2\}$$

Subsequently, the global motion estimating unit 1201 repeatedly performs the calculating process using Expressions (35) and (36) a plurality of times. After that, by using Expression (37), the global motion estimating unit 1201 specifies the result of the clustering process performed on the source frame as a label initial value for a clustering process performed on the motion vectors.

$$z^{(0)}(i) = z_{src}^{(T)}(i), \forall i \in \Lambda^2 \tag{37}$$

T: NUMBER OF TIMES OF ITERATIONS ACCORDING TO k-MEANS METHOD

After having calculated the label z(i) in this manner, the global motion estimating unit 1201 calculates as many global motions as K, by calculating an average value by using Expression (38) or by calculating a median value by using Expression (39). Another arrangement is acceptable in which the global motion estimating unit 1201 calculates the global motions by using both Expressions (38) and (39), i.e., by calculating an average value by assigning the average value calculated from Expression (38) into u in Expression (39).

$$\bar{u}_k = \frac{\sum_{u \in U_k} u}{Num(U_k)} \tag{38}$$

$$U_k = \{u(i) \mid z(i) = k, \forall i \in \Lambda^2\}$$

$$\bar{u}_k = \arg\min_{u \in U_k} \sum_{u_j \in U_k} \|u - u_j\|_L \tag{39}$$

$$U_k = \{u(i) \mid z(i) = k, \forall i \in \Lambda^2\}$$

After that, of the calculated global motions the number of which is K, the global motion estimating unit 1201 selects the global motion of which the number of elements $Num(U_k)$ is the largest and sets the selected global motion to a failure-preventing vector $u_g$ by specifying the selected global motion as the failure-preventing vector $u_g$. In the following explanation, this failure-preventing vector will be referred to as a global motion vector $u_g$.

The global motion estimating unit 1201 calculates a global motion reliability level indicating whether the global motion vector $u_g$ that has been calculated by the global motion estimating unit 1201 and serves as a failure-preventing vector is appropriate as a vector used for inserting an interpolated frame. More specifically, the global motion reliability calculator 1203 calculates the global motion reliability level by using the same method as the one used by the motion vector reliability calculator 102.

In other words, the global motion reliability calculator 1203 calculates a global motion reliability level $\alpha(i, u_g)$ expressed by Expression (40) by assigning the global motion vector $u_g$ into Expression (7) used in the first embodiment, instead of assigning the motion vector.

$$\alpha(i, u_g) \tag{40}$$

GLOBAL MOTION VECTOR $u_g$

The image blending unit 1204 generates a motion compensated image and a global motion image and further generates an interpolated frame according to a weighted average of the motion compensated image and the global motion image that has been calculated by using weighting factors based on the motion vector reliability level $\alpha(i, u(i))$ and the global motion reliability level $\alpha(i, u_g)$.

More specifically, the image blending unit 1204 first generates a global motion pixel $I_g(x)$ by using Expression (41-1). After that, the image blending unit 1204 generates a motion compensated pixel $I_{mc}(x)$ obtained by shifting the pixel in the source frame with the motion vector u(i), by using Expression (41-2).

$$I_g(x) = I_{src}(x - \Delta t u_g) \tag{41-1}$$

$$I_{mc}(x) = I_{src}(x - \Delta t u(i)) \tag{41-2}$$

In Expression (41-1), only the source frame is used for generating the global motion image; however, another arrangement is acceptable in which an average image of the source frame and the destination frame is used for generating the global motion image, as shown in Expressions (42-1) and (42-2).

$$I_q(x) = (1 - \Delta t)I_{src}(x - \Delta t u_g) + \Delta t I_{dst}(x + (1 - \Delta t)u_g) \tag{42-1}$$

$$I_{mc}(x) = (1 - \Delta t)I_{src}(x - \Delta t u(i)) + \Delta t I_{dst}(x + (1 - \Delta t)u(i)) \tag{42-2}$$

The global motion pixel $I_g(x)$ has the global motion reliability level $\alpha(i, u_g)$, whereas the motion compensated pixel $I_{mc}(x)$ has the motion vector reliability level $\alpha(i, u(i))$. Thus, by using Expression (43), the image blending unit 1204 calculates an interpolated pixel $I_{int}(x)$ by using weighting factors based on these reliability levels.

$$I_{int}(x) = \frac{\alpha(i, u(i))I_{mc}(x) + \alpha(i, u_g)I_g(x)}{\alpha(i, u(i)) + \alpha(i, u_g)} \tag{43}$$

In the case where both the global motion reliability level $\alpha(i, u_g)$ and the motion vector reliability level $\alpha(i, u(i))$ are 0, the interpolated pixel according to the weighted average calculated from Expression (43) is indeterminate. Thus, in the case where both the global motion reliability level $\alpha(i, u_g)$ and the motion vector reliability level $\alpha(i, u(i))$ are 0, it is a good idea to calculate the interpolated pixel $I_{int}(x)$ by using Expression (44-1) or (44-2).

$$I_{int}(x) = 0.5 I_{mc}(x) + 0.5 I_g(x) \tag{44-1}$$

$$I_{int}(x) = I_g(x) \tag{44-2}$$

Next, the interpolated image generating process according to the fourth embodiment that is configured as described above will be explained, with reference to FIG. 13. First, like in the first embodiment, the motion estimating unit 101 estimates a motion in the block i and calculates a motion vector u(i) by using Expression (2) (step S41). After that, the global motion estimating unit 1201 determines a global motion. In other words, the global motion estimating unit 1201 calculates a global motion vector $u_g$ (step S42).

Figure 14:
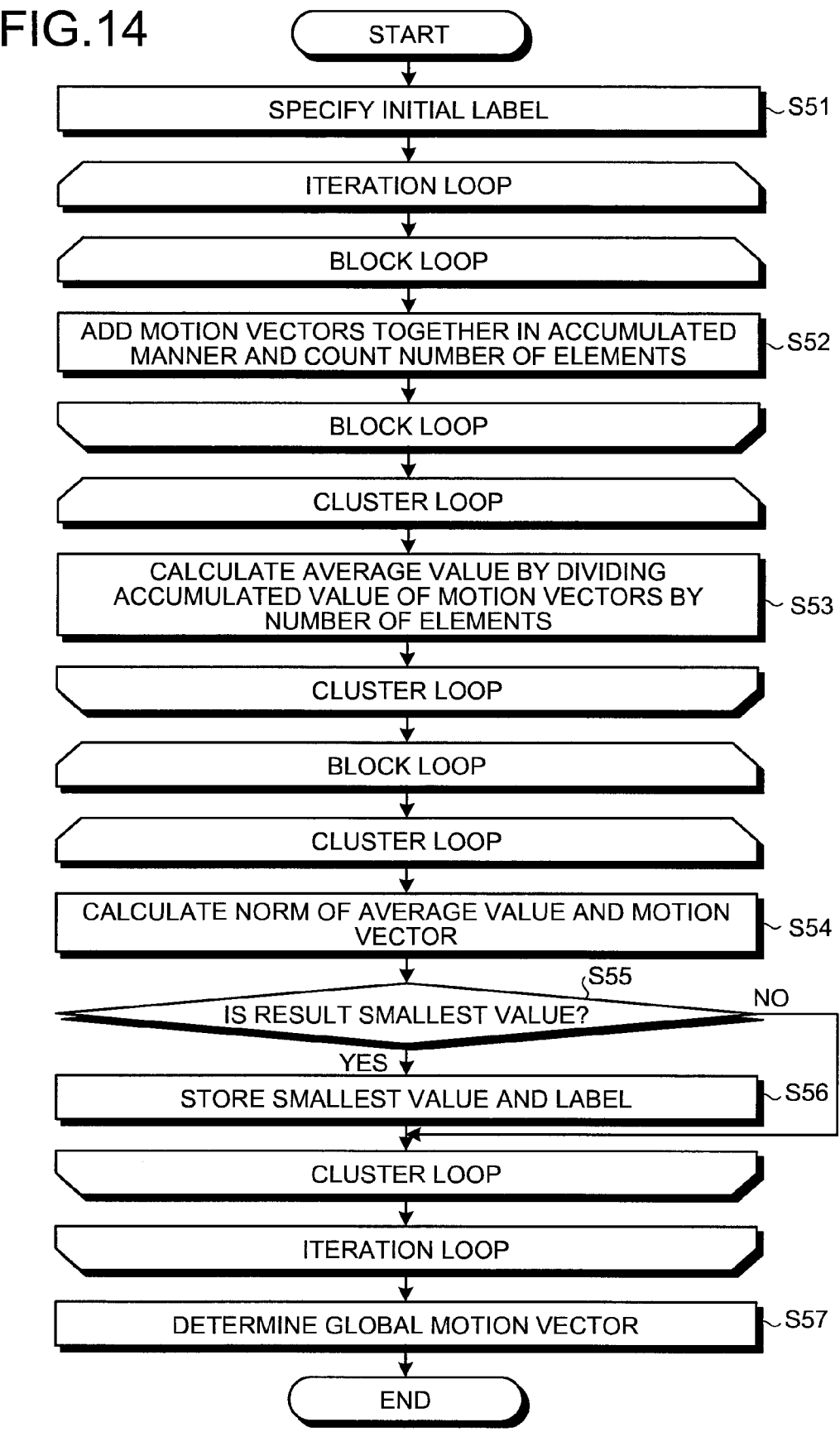
FIG. 14 is a flowchart of a procedure in a process for calculating a global motion vector $u_g$.

FIG. 14 is a flowchart of a procedure in the process for calculating the global motion vector $u_g$. First, the global motion estimating unit 1201 specifies an initial label $z^{(0)}(i)$ by using Expression (37) (step S51). After that, the global motion estimating unit 1201 initializes a variable indicating the number of elements and a variable indicating the average value, adds the motion vectors u in the cluster together in an accumulated manner, and counts the number of elements of the motion vectors u in the cluster (step S52). This process is repeatedly performed for each of all the motion vectors in the block.

Subsequently, the global motion estimating unit 1201 divides the accumulated value of the motion vectors u by the number of elements Num that has been counted (step S53). This process is repeatedly performed for each of all the clusters. As a result, an average value is calculated by using Expression (38).

After that, the global motion estimating unit 1201 initializes a variable indicating the smallest value and calculates an L−1 norm of the average value of the motion vectors calculated at step S53 and the motion vector serving as the current process target (step S54). The global motion estimating unit 1201 then checks to see if the calculated value is the smallest value (step S55). In the case where the calculated value is the smallest value (step S55: Yes), the global motion estimating unit 1201 stores the smallest value and the label z(i) at this point in time into a storage medium such as a memory (step S56). On the contrary, in the case where the calculated value s not the smallest value at step S55 (step S55: No), the process at step S56 will not be performed. The processes at steps S54 through S56 are repeatedly performed for each of all the clusters. After that, the processes are repeatedly performed for each of all the blocks. As a result, an average value of the motion vectors for each of the clusters has been calculated by using Expression (39). In other words, a global motion that is a representative motion vector has been calculated for each of the clusters.

Subsequently, of the representative motion vectors for the clusters that have been calculated, the global motion estimating unit 1201 selects, for example, a motion vector of which the number of elements Num($U_k$) is the largest and determines the selected motion vector as a global motion vector $u_g$ (step S57).

Figure 13:
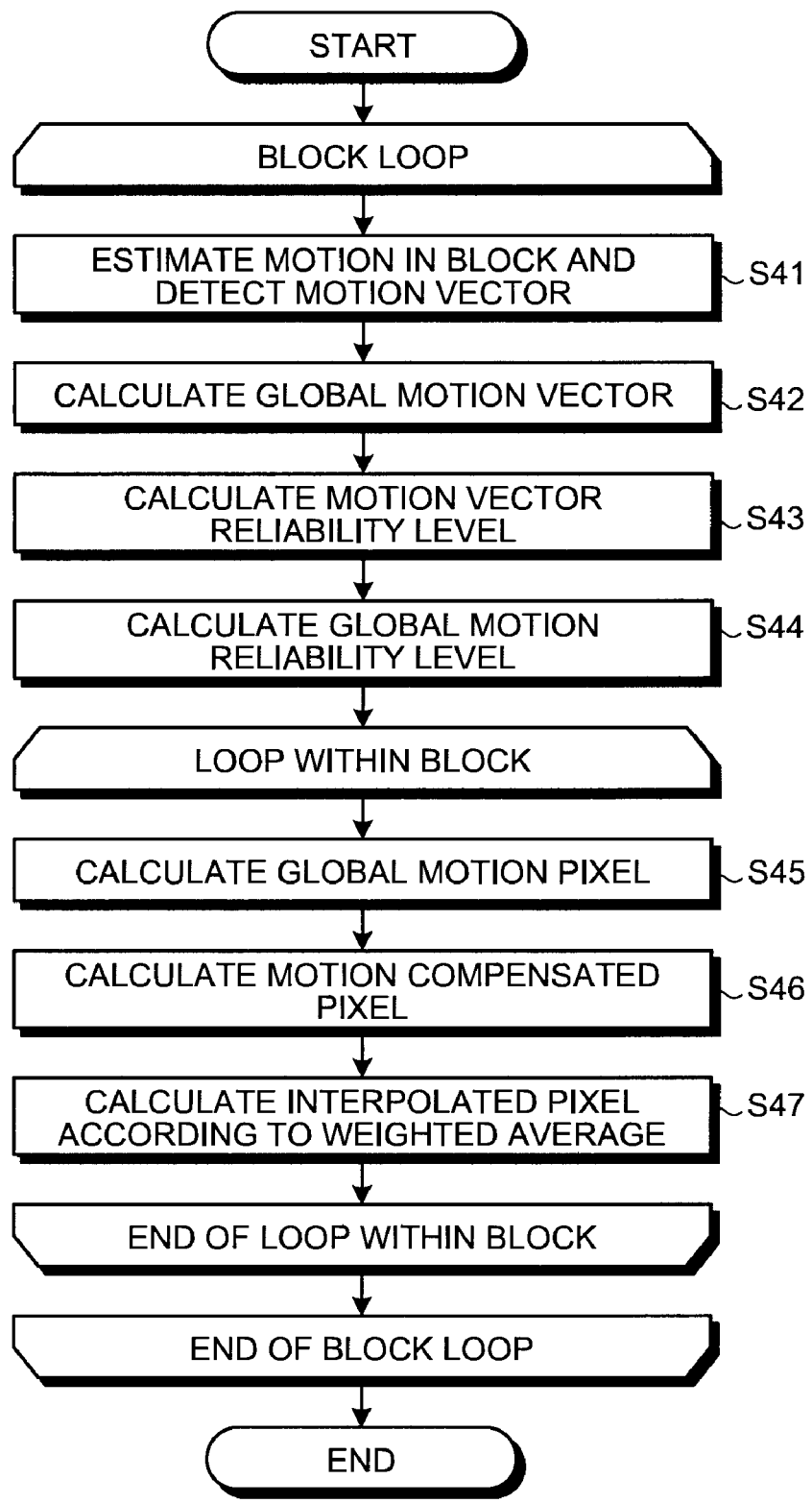
FIG. 13 is a flowchart of a procedure in an interpolated image generating process according to the fourth embodiment.

Returning to the description of FIG. 13, when the global motion vector $u_g$ has been calculated, the motion vector reliability calculator 102 calculates a motion vector reliability level α(i, u(i)) by using Expression (7), in the same manner as in the first embodiment (step S43). Subsequently, the global motion reliability calculator 1203 calculates a global motion reliability level α(i, $u_g$) by assigning the global motion vector $u_g$ into Expression (7) (step S44).

After that, the image blending unit 1204 calculates a global motion pixel $I_g(x)$ by using Expression (41-1) (step S45) and also calculates a motion compensated pixel $I_{mc}(x)$ by using Expression (41-2) (step S46). After that, the image blending unit 1204 calculates an interpolated pixel $I_{int}(x)$ according to a weighted average calculated from Expression (43) (step S47). The process for calculating an interpolated pixel $I_{int}(x)$ at steps S45 through S47 is performed for each of all the pixels in the block i. The series of processes at steps S41 through S47 is performed for each of all the blocks in the source frame. As a result, an interpolated frame is generated.

As explained above, the interpolated image generating apparatus 1200 according to the fourth embodiment uses the global motion that reflects the motion in the entire screen as a failure-preventing vector and calculates the global motion reliability level as a failure-preventing vector reliability level. The interpolated image generating apparatus 1200 generates the interpolated image according to the weighted average calculated by using the global motion reliability level. Thus, even if the moving image is such an image that the entire image moves in the manner of a parallel translation, it is possible to calculate the failure-preventing vector without any deviations. Consequently, it is possible to generate an interpolated image having high quality.

Next, a fifth embodiment of the present invention will be explained. Each of the interpolated image generating apparatuses according to the first to the fourth embodiments calculates the motion vector reliability level with respect to the source image and the destination image and generates the interpolated image by using the motion vector reliability level. However, to generate an interpolated image having high quality even in the case where an occlusion is caused, an interpolated image generating apparatus according to the fifth embodiment calculates a plurality of motion vector reliability levels by further using an image that is earlier than the source image and an image that is later than the destination image and generates the interpolated image by using these motion vector reliability levels.

Figure 15:
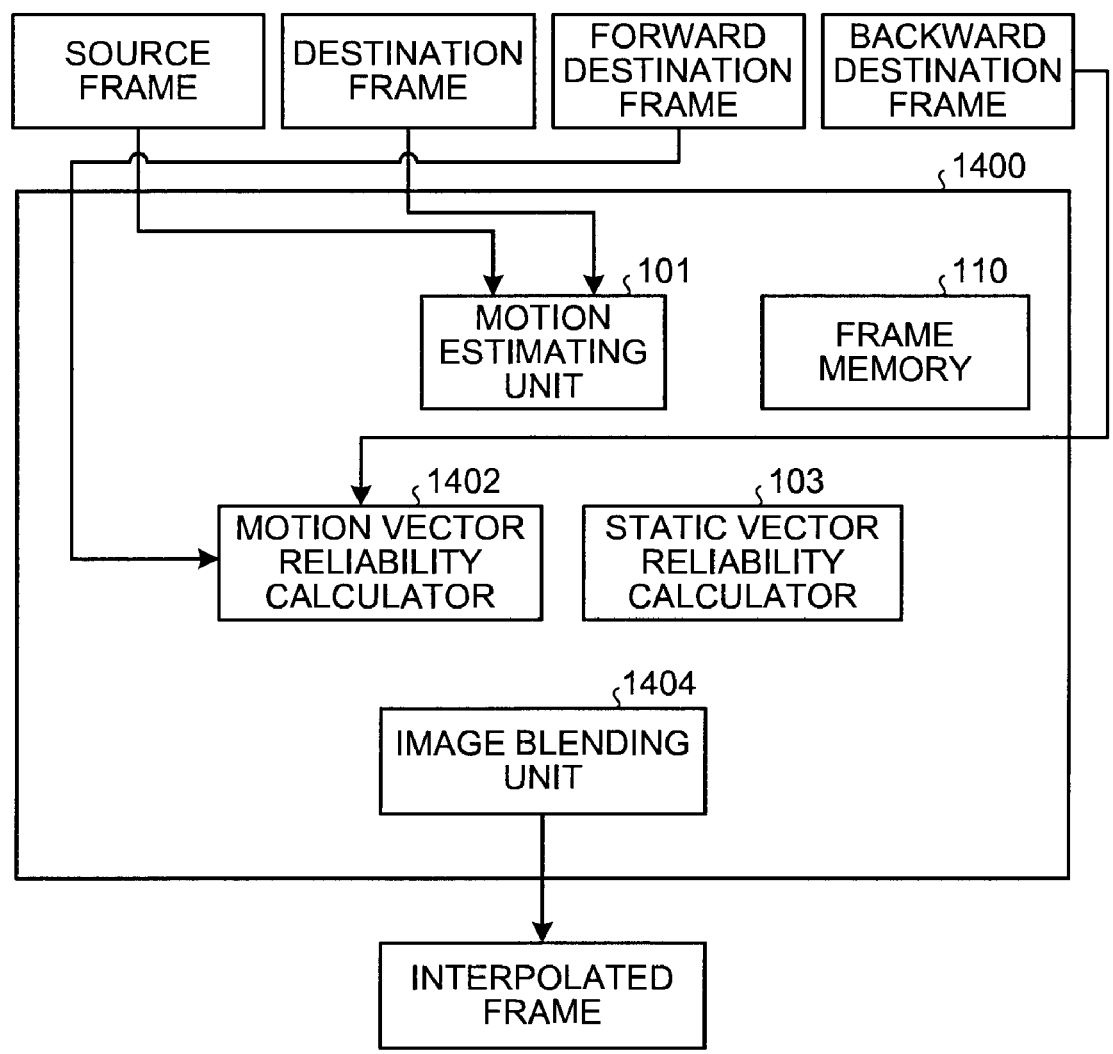
FIG. 15 is a functional block diagram of an interpolated image generating apparatus according to a fifth embodiment of the present invention.

As shown in FIG. 15, an interpolated image generating apparatus 1400 according to the fifth embodiment includes: the motion estimating unit 101, a motion vector reliability calculator 1402; the static vector reliability calculator 103, an image blending unit 1404, and the frame memory 110. The motion estimating unit 101, the static vector reliability calculator 103, and the frame memory 110 have the same functions as those according to the first embodiment, respectively.

The fifth embodiment is characterized in that a backward destination frame $I_{dst\_back}$ that is a frame of which the time is earlier (i.e., positioned toward the back) than the source frame $I_{src}$ and a forward destination frame $I_{dst\_for}$ that is a frame of which the time is later (i.e., positioned toward the front) than the destination frame $I_{dst}$ are used, in addition to the source frame $I_{src}$ and the destination frame $I_{dst}$.

In other words, the time of the backward destination frame $I_{dst\_back}$ is expressed as t−1; the time of the source frame is expressed as t; the time of the destination frame is expressed as t+1; and the time of the forward destination frame Idst_for is expressed as t+2. It is assumed that an interpolated frame is to be inserted between the source frame and the destination frame, i.e., between the time t and the time t+1.

Figure 16:
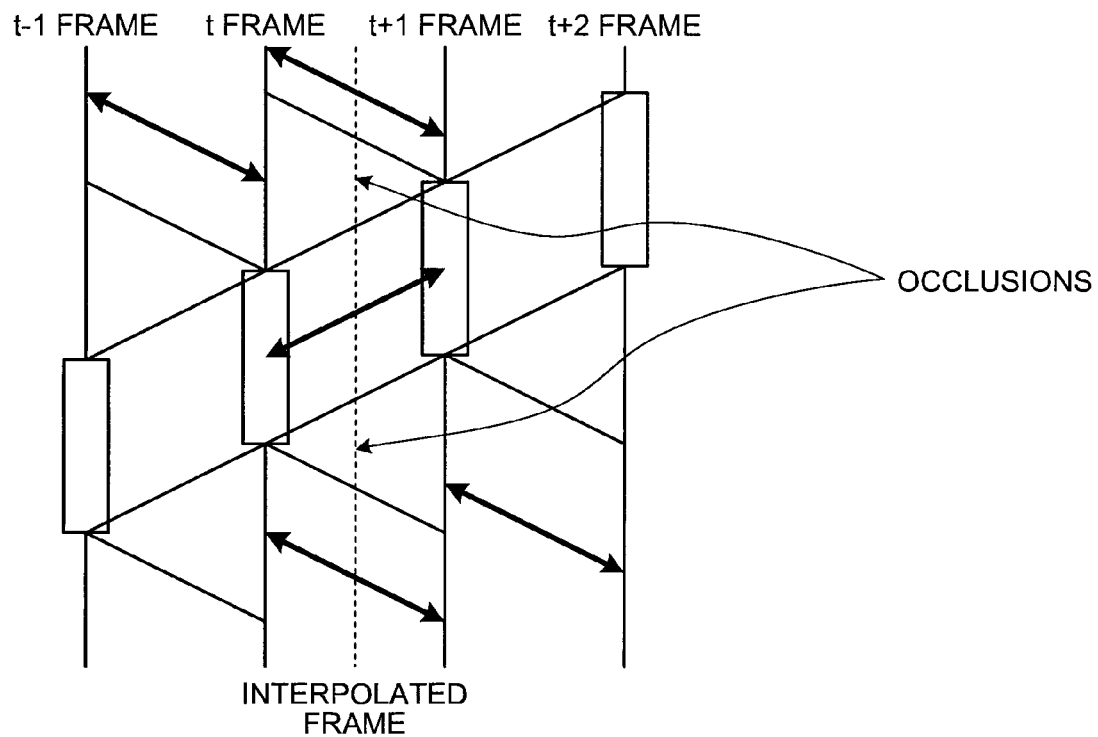
FIG. 16 is a schematic drawing for explaining occlusions.

FIG. 16 is a schematic drawing for explaining occlusions. As shown in FIG. 16, occlusions are caused in an area in which the background appears or disappears in front of or behind a moving object. Generally speaking, it is difficult to properly solve the problem of an occlusion between the two frames. According to the fifth embodiment, however, by using the backward destination frame and the forward destination frame in addition to the source frame and the destination as described above, it is possible to generate an interpolated image having high quality even in the case where an occlusion is caused.

The fifth embodiment will be explained based on a process performed in a pixel position x within a source block i. A set of surrounding vectors, which are the motion vectors for the source block and the surrounding blocks of the source block, can be expressed by using Expression (45).

$$U(i) = \{u(i), u(i+(-1, 0)^T), u(i+(1, 0)^T), u(i+(0, -1)^T), u(i+(0, 1)^T)\} \quad (45)$$

Returning to the description of FIG. 15, the motion vector reliability calculator 1402 calculates a motion vector reliability level with respect to a pixel position in the source frame, in the same manner as in the first embodiment. In addition, the motion vector reliability calculator 1402 calculates a motion vector reliability level with respect to a pixel position in the backward destination frame and a motion vector reliability level with respect to a pixel position in the forward destination frame.

Also, the motion vector reliability calculator 1402 according to the fifth embodiment calculates the motion vector reliability level while taking the motion vectors for the source block i and the surroundings blocks of the source block i into consideration. According to the fifth embodiment, the surrounding blocks denote five blocks in total that are namely the source block i and the four blocks that are positioned above, below, to the left, and to the right of the source block i. The motion vectors for these five blocks are used as surrounding vectors, which are the motion vectors for the surrounding blocks. It should be noted, however, that the surrounding vectors are not limited to the ones in the present example. For example, another arrangement is acceptable in which the surrounding blocks are areas corresponding to nine blocks in total that include the blocks that are positioned in the diagonal directions from the source block, in addition to the blocks that are positioned above, below, to the left, and to the right of the source block, so that the motion vectors for these nine blocks are used as the surrounding vectors.

The motion vector reliability calculator 1402 calculates a motion vector reliability level $\alpha(x, u)$ with respect to each of the surrounding vectors $u \in U$ in the pixel position x by using Expression (46).

$$\alpha(x, u) = \exp\left(-\frac{DPD(x, u)^2}{2\sigma_I^2}\right) \quad (46)$$

$$DPD(x, u) = I_{dst}(x + (1 - \Delta t)u) - I_{src}(x - \Delta tu)$$

DPD: Displaced Pixel Difference (MOTION VECTOR DISPLACEMENT DIFFERENCE)

Another arrangement is acceptable in which, like in the first embodiment, the motion vector reliability calculator 1402 calculates the motion vector reliability level $\alpha(x, u)$ by using a prior probability of the motion vector. Yet another arrangement is acceptable in which the motion vector reliability calculator 1402 calculates the motion vector reliability level $\alpha(x, u)$ with an inverse, by using Expression (47).

$$\alpha(x, u) = \frac{1}{|DPD(x, u)| + \varepsilon} \quad (47)$$

$\varepsilon > 0$: SAFE CONSTANT USEDFOR AVOIDING DIVISIONS BY ZERO

Figure 17:
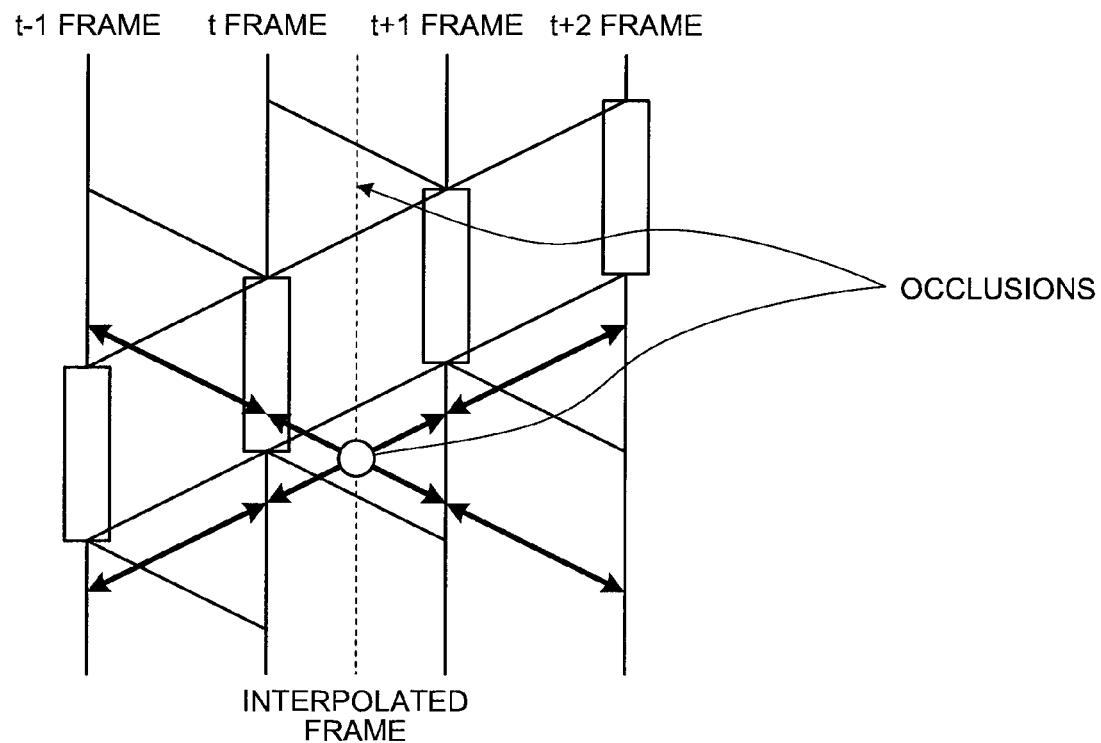
FIG. 17 is a drawing for explaining motion vector reliability levels with respect to a forward destination frame and a backward destination frame.

As shown in FIG. 17, the motion vector reliability calculator 1402 calculates a motion vector reliability level $\alpha_{for}(x, u)$ with respect to the surrounding vectors for the forward destination frame by using Expression (48) and also calculates a motion vector reliability level $\alpha_{back}(x, u)$ with respect to the surrounding vectors for the backward destination frame by using Expression (49).

$$\alpha_{for}(x, u) = \exp\left(-\frac{DPD_{for}(x, u)^2}{2\sigma_I^2}\right) \quad (48)$$

$$DPD_{for}(x, u) = I_{dst\_for}(x + (2 - \Delta t)u) - I_{dst}(x + (1 - \Delta t)u)$$

$$\alpha_{back}(x, u) = \exp\left(-\frac{DPD_{back}(x, u)^2}{2\sigma_I^2}\right) \quad (49)$$

$$DPD_{back}(x, u) = I_{dst\_back}(x - (1 + \Delta t)u) - I_{src}(x - \Delta tu)$$

The image blending unit 1404 calculates a motion compensated pixel by performing a motion compensating process based on the surrounding vectors. Also, the image blending unit 1404 calculates a motion compensated pixel based on the surrounding vectors with respect to the backward destination frame, a motion compensated pixel based on the surrounding vectors with respect to the forward destination frame, and a still pixel. The image blending unit 1404 further generates an interpolated frame by calculating a weighted average of the three motion compensated pixels and the still pixel, by using weighting factors based on the three motion vector reliability levels and the static vector reliability level.

More specifically the image blending unit 1404 calculates a motion compensated pixel $I_{mc}(x, u)$ based on each of the surrounding vectors $u \in U(i)$ by using Expression (50-1), and also calculates a still pixel $I_{still}(x)$ by using Expression (50-2).

$$I_{mc}(x,u) = I_{src}(x - \Delta tu) \quad (50\text{-}1)$$

$$I_{still}(x) = I_{src}(x) \quad (50\text{-}2)$$

Another arrangement is acceptable in which the image blending unit 1404 is configured so as to calculate the motion compensated pixel $I_{mc}(x, u)$ and the still pixel $I_{still}(x)$ by using an average pixel of a pixel $I_{src}$ in the source frame and a pixel $I_{dst}$ in the destination frame.

Further, the image blending unit 1404 according to the fifth embodiment calculates a motion compensated pixel $I_{mc\_for}(x, u)$ based on the surrounding vectors with respect to the forward destination frame by using Expression (51-1) and also calculates a motion compensated pixel $I_{mc\_back}(x, u)$ based on the surrounding vectors with respect to the backward destination frame by using Expression (51-2).

$$I_{mc\_for}(x,u) = I_{dst}(x + (1 - \Delta t)u) \quad (51\text{-}1)$$

$$I_{mc\_back}(x,u) = I_{src}(x - \Delta tu) \quad (51\text{-}2)$$

After that, by calculating a weighted average using Expression (52), the image blending unit 1404 calculates an interpolated pixel $I_{int}(x)$.

$$I_{int}(x) = \frac{\left\{\sum_{u \in U(i)} \alpha(x, u) I_{mc}(x, u)\right\} + \left\{\sum_{u \in U(i)} \alpha_{for}(x, u) I_{mc\_for}(x, u)\right\} + \left\{\sum_{u \in U(i)} \alpha_{back}(x, u) I_{mc\_back}(x, u)\right\} + \alpha(x, 0) I_{still}(x)}{\left\{\sum_{u \in U(i)} \alpha(x, u)\right\} + \left\{\sum_{u \in U(i)} \alpha_{for}(x, u)\right\} + \left\{\sum_{u \in U(i)} \alpha_{back}(x, u)\right\} + \alpha(x, 0)} \quad (52)$$

Figure 18:
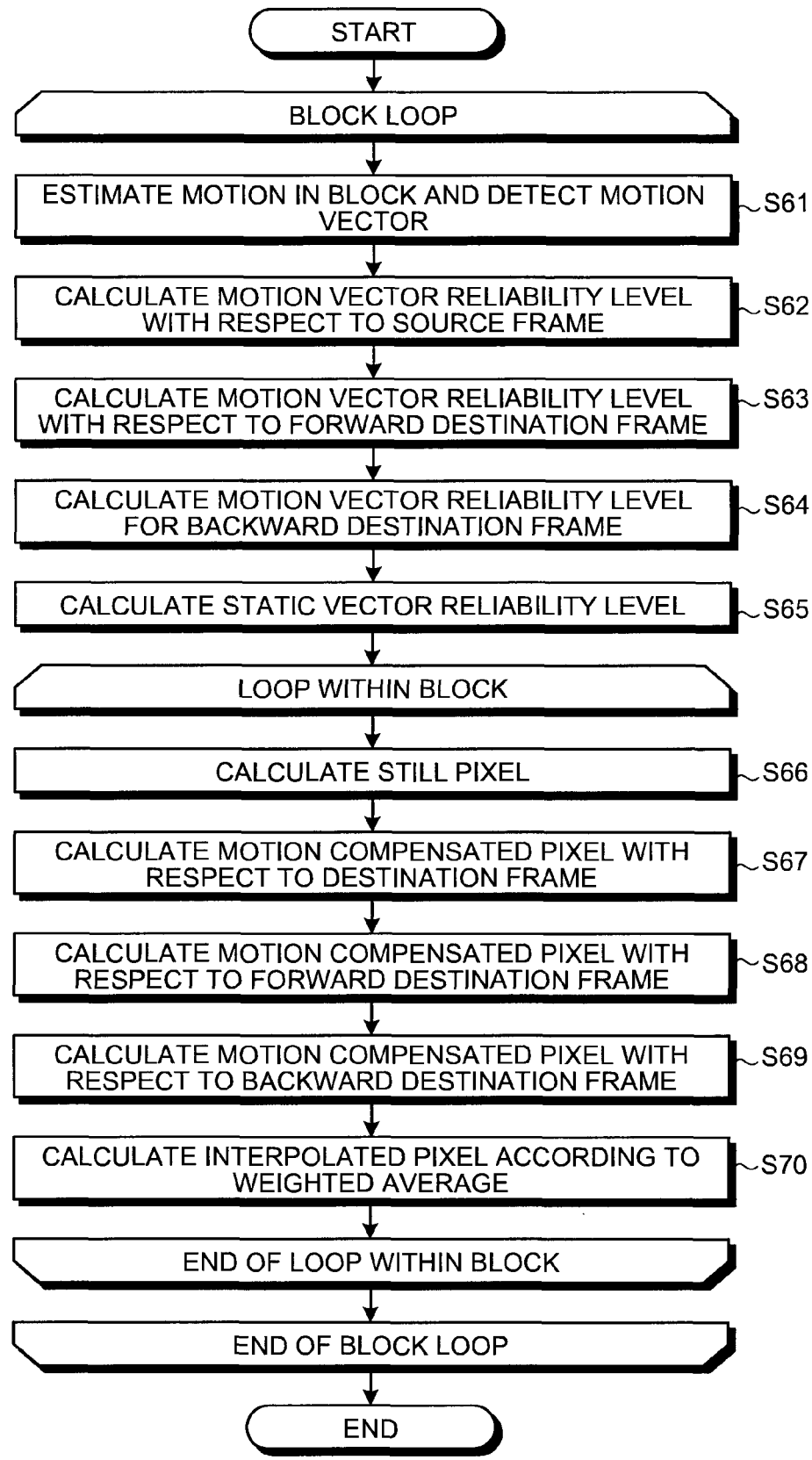
FIG. 18 is a flowchart of a procedure in an interpolated image generating process according to the fifth embodiment.

Next, the interpolated image generating process according to the fifth embodiment that is configured as described above will be explained with reference to FIG. 18. First, like in the first embodiment, the motion estimating unit 101 estimates a motion in the block i and calculates a motion vector u(i) by using Expression (2) (step S61).

After that, by using Expression (46), the motion vector reliability calculator 1402 calculates a motion vector reliability level α(i, u(i)) with respect to the destination frame, by using the motion vectors for the surrounding blocks (i.e., the surrounding vectors) (step S62). Also, by using Expression (48), the motion vector reliability calculator 1402 calculates a motion vector reliability level $\alpha_{for}$(i, u(i)) with respect to the forward destination frame, by using the surrounding vectors (step S63). Further, by using Expression (49), the motion vector reliability calculator 1402 calculates a motion vector reliability level $\alpha_{back}$(i, u(i)) with respect to the backward destination frame, by using the surrounding vectors (step S64).

Subsequently, the static vector reliability calculator 103 calculates a static vector reliability level α(i, 0) by assigning the static vector u(i)=0 into Expression (7) (step S65). After that, by using Expression (50-2), the image blending unit 1404 calculates a still pixel $I_{still}$(x) in the pixel position x within the block i (step S66).

Subsequently, by using Expression (50-1), the image blending unit 1404 calculates a motion compensated pixel $I_{mc}$(x, u) in the pixel position x within the block i of the destination frame (step S67). After that, by using Expression (51-1), the image blending unit 1404 calculates a motion compensated pixel $I_{mc\_for}$ (x, u) with respect to the forward destination frame (step S68). Also, by using Expression (51-2), the image blending unit 1404 calculates a motion compensated pixel $I_{mc\_back}$(x, u) with respect to the backward destination frame (step S69).

Subsequently, the image blending unit 1404 calculates an interpolated pixel $I_{int}$(x) according to a weighted average calculated from Expression (52) (step S70). The process for calculating an interpolated pixel $I_{int}$(x) at steps S66 through S70 is performed for each of all the pixels within the block i. As a result, an interpolated image is generated in units of blocks (i.e., the blocks i). Also, the series of processes at steps S61 through S70 is performed for each of all the blocks in the source frame. As a result, an interpolated frame is generated.

As explained above, the interpolated image generating apparatus 1400 according to the fifth embodiment calculates the plurality of motion vector reliability levels by using the backward destination frame of which the time is earlier than the source frame and the forward destination frame of which the time is later than the destination frame, in addition to the source frame and the destination frame. The interpolated image generating apparatus 1400 then generates the interpolated image according to the weighted average calculated by using these motion vector reliability levels. Thus, it is possible to generate an interpolated image having high quality even in the case where the image contains an occlusion.

Each of the interpolated image generating apparatuses 100, 500, 900, 1200, and 1400 according to the first to the fifth embodiments includes a controlling device such as a Central Processing Unit (CPU), storage devices such as a Read Only Memory (ROM) and a Random Access Memory (RAM), external storage devices such as a Hard Disk Drive (HDD) and a Compact Disk (CD) drive device, a display device such as a display monitor, and input devices such as a keyboard and a mouse. Each of the interpolated image generating apparatuses 100, 500, 900, 1200, and 1400 has a hardware configuration to which a commonly-used computer can be applied.

An interpolated image generating program executed by each of the interpolated image generating apparatuses 100, 500, 900, 1200, and 1400 according to the first to the fifth embodiments is provided as being recorded on a computer-readable recording medium such as a Compact Disk Read-Only Memory (CD-ROM), a Flexible Disk (FD), a Compact Disk Recordable (CD-R), or a Digital Versatile Disk (DVD), in a file that is in an installable format or in an executable format.

Another arrangement is acceptable in which the interpolated image generating program executed by each of the interpolated image generating apparatuses 100, 500, 900, 1200, and 1400 according to the first to the fifth embodiments is provided as being incorporated into the ROM or the like, in advance.

The interpolated image generating program executed by each of the interpolated image generating apparatuses 100, 500, 900, 1200, and 1400 according to the first to the fifth embodiments has a module configuration that includes the functional units described above (e.g., the motion estimating unit, the motion vector reliability calculator, the static vector reliability calculator, the reliability correcting unit, the image blending unit, the global motion estimating unit, and the global motion reliability calculator). As the actual hardware configuration, these functional units are loaded into a main storage device when the CPU (i.e., the processor) reads and executes the interpolated image generating program from the storage device described above, so that the motion estimating unit, the motion vector reliability calculator, the static vector reliability calculator, the reliability correcting unit, the image blending unit, the global motion estimating unit, and the global motion reliability calculator are generated in the main storage device.

The present invention is not limited only to the exemplary embodiments described above. At the stage of enabling the invention, it is possible to embody any of the exemplary embodiments while applying a modification to any of the constituent elements thereof without departing from the gist of the invention. Also, it is possible to form other various inventions by combining, as necessary, two or more of the constituent elements that are disclosed in the exemplary embodiments described above. For example, it is acceptable to delete any of the constituent elements described in the exemplary embodiments. Further, it is also acceptable to combine, as necessary, two or more of the constituent elements that are described in mutually different ones of the exemplary embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interpolated image generating apparatus that generates an interpolated image to be inserted between a source image and a destination image, the apparatus comprising:
   a motion estimating unit that estimates a motion vector from the source image to the destination image;
   a first calculator that calculates a motion vector reliability level indicating reliability of the motion vector serving as a vector used for inserting the interpolated image, a value of the motion vector reliability level being determined in such a manner that the stronger a correlation is between an area in the source image and an area in the destination image that are brought into correspondence with each other by the motion vector, the larger is the value;

a second calculator that calculates a failure-preventing vector reliability level indicating reliability of a failure-preventing vector that is a predetermined vector used for preventing image failures;

a correcting unit that calculates a reliability ratio that is a ratio between the motion vector reliability level and the failure-preventing vector reliability level and corrects the motion vector reliability level and the failure-preventing reliability level in such a manner that the closer the calculated reliability ratio is to 1, the smaller the value of the motion vector reliability level becomes and the larger the value of the failure-preventing vector reliability level becomes; and a blending unit that obtains a motion compensated image by performing a motion compensating process based on the motion vector, obtains a failure-preventing image by performing a motion compensating process based on the failure-preventing vector, and generates the interpolated image by blending the motion compensated image and the failure-preventing image according to a weighted average of the motion compensated image and the failure-preventing image that has been calculated by using a weighting factor based on the motion vector reliability level and the failure-preventing vector reliability level.

2. The apparatus according to claim 1, wherein the first calculator calculates the motion vector reliability level in units of pixels based on a motion vector for a predetermined process target area in the source image and a motion vector for a surrounding area that is an area positioned adjacent to the process target area, and the second calculator calculates the failure-preventing vector reliability level in units of pixels.

3. The apparatus according to claim 1, wherein the failure-preventing vector is a static vector, and the failure-preventing image is a still image.

4. The apparatus according to claim 1, further comprising a global motion estimating unit that calculates a global motion indicating a motion in an entire image based on the motion vector, and sets the global motion to the failure-preventing vector, wherein the second calculator calculates the failure-preventing vector reliability level based on the global motion.

5. The apparatus according to claim 1, wherein the first calculator further calculates a second motion vector reliability level of which a value is determined in such a manner that the stronger a correlation is between the source image and a backward destination image that is chronologically earlier than the source image, the larger is the value and calculates a third motion vector reliability level of which a value is determined in such a manner that the stronger a correlation is between the destination image and a forward destination image that is chronologically later than the destination image, the larger is the value, and the image blending unit further obtains a second motion compensated image based on the motion vector with respect to the backward destination image and a third motion compensated image based on the motion vector with respect to the forward destination image and generates the interpolated image according to a weighted average of the motion compensated image, the second motion compensated image, the third motion compensated image, and the failure-preventing image that has been calculated by using a weighting factor based on the motion vector reliability level, the second motion vector reliability level, the third motion vector reliability level, and the failure-preventing vector reliability level.

6. An interpolated image generating method that generates an interpolated image to be inserted between a source image and a destination image, the method comprising:

estimating a motion vector from the source image to the destination image;

calculating a motion vector reliability level indicating reliability of the motion vector, a value of the motion vector reliability level being determined in such a manner that the stronger a correlation is between an area in the source image and an area in the destination image that are brought into correspondence with each other by the motion vector, the larger is the value;

calculating a failure-preventing vector reliability level indicating reliability of a failure-preventing vector that is a predetermined vector used for preventing image failures;

calculating a reliability ratio that is a ratio between the motion vector reliability level and the failure-preventing vector reliability level and corrects the motion vector reliability level and the failure-preventing reliability level in such a manner that the closer the calculated reliability ratio is to 1, the smaller the value of the motion vector reliability level becomes and the larger the value of the failure-preventing vector reliability level becomes; and generating the interpolated image by obtaining a motion compensated image by performing a motion compensating process based on the motion vector, obtaining a failure-preventing image by performing a motion compensating process based on the failure-preventing vector, and by blending the motion compensated image and the failure-preventing image according to a weighted average of the motion compensated image and the failure-preventing image that has been calculated by using a weighting factor based on the motion vector reliability level and the failure-preventing vector reliability level.

7. The method according to claim 6, wherein the calculating the motion vector reliability level includes calculating the motion vector reliability level in units of pixels based on a motion vector for a predetermined process target area in the source image and a motion vector for a surrounding area that is an area positioned adjacent to the process target area, and the calculating the failure-preventing vector reliability level includes calculating the failure-preventing vector reliability level in units of pixels.

8. The method according to claim 6, wherein the failure-preventing vector is a static vector, and the failure-preventing image is a still image.

9. The method according to claim 6, further comprising calculating a global motion indicating a motion in an entire image based on the motion vector, and setting the global motion to the failure-preventing vector, wherein the calculating the failure-preventing vector reliability level includes the failure-preventing vector reliability level based on the global motion.

10. The method according to claim 6, wherein the calculating the motion vector reliability level includes a second motion vector reliability level of which a value is determined in such a manner that the stronger a correlation is between the source image and a backward destination image that is chronologically earlier than the source image, the larger is the value and calculates a third motion vector reliability level of which a value is determined in such a manner that the stronger a correlation is between the destination image and a forward destination image that is chronologically later than the destination image, the larger is the value, and the generating includes obtaining a second motion compensated image based on the motion vector with respect to the backward destination image and a third motion compensated image based on the motion vector with respect to the forward destination image and generating the interpolated image according to a weighted average of the motion compensated image, the second motion compensated image, the third motion compensated image, and the failure-preventing image that has been calculated by using a weighting factor based on the motion vector reliability level, the second motion vector reliability level, the third motion vector reliability level, and the failure-preventing vector reliability level.

11. A computer program product having a non-transitory computer readable medium including programmed instructions for generating an interpolated image to be inserted between a source image and a destination image, wherein the instructions, when executed by a computer, cause the computer to perform:

estimating a motion vector from the source image to the destination image;

calculating a motion vector reliability level indicating reliability of the motion vector, a value of the motion vector reliability level being determined in such a manner that the stronger a correlation is between an area in the source image and an area in the destination image that are brought into correspondence with each other by the motion vector, the larger is the value;

calculating a failure-preventing vector reliability level indicating reliability of a failure-preventing vector that is a predetermined vector used for preventing image failures;

calculating a reliability ratio that is a ratio between the motion vector reliability level and the failure-preventing vector reliability level and corrects the motion vector reliability level and the failure-preventing reliability level in such a manner that the closer the calculated reliability ratio is to 1, the smaller the value of the motion vector reliability level becomes and the larger the value of the failure-preventing vector reliability level becomes; and generating the interpolated image by obtaining a motion compensated image by performing a motion compensating process based on the motion vector, obtaining a failure-preventing image by performing a motion compensating process based on the failure-preventing vector, and by blending the motion compensated image and the failure-preventing image according to a weighted average of the motion compensated image and the failure-preventing image that has been calculated by using a weighting factor based on the motion vector reliability level and the failure-preventing vector reliability level.

12. The product according to claim 11, wherein the calculating the motion vector reliability level includes calculating the motion vector reliability level in units of pixels based on a motion vector for a predetermined process target area in the source image and a motion vector for a surrounding area that is an area positioned adjacent to the process target area, and the calculating the failure-preventing vector reliability level includes calculating the failure-preventing vector reliability level in units of pixels.

13. The product according to claim 11, wherein the failure-preventing vector is a static vector, and the failure-preventing image is a still image.

14. The product according to claim 11, wherein the instructions, further cause the computer to perform:

calculating a global motion indicating a motion in an entire image based on the motion vector, and setting the global motion to the failure-preventing vector, wherein the calculating the failure-preventing vector reliability level includes the failure-preventing vector reliability level based on the global motion.

15. The product according to claim 11, wherein the calculating the motion vector reliability level includes a second motion vector reliability level of which a value is determined in such a manner that the stronger a correlation is between the source image and a backward destination image that is chronologically earlier than the source image, the larger is the value and calculates a third motion vector reliability level of which a value is determined in such a manner that the stronger a correlation is between the destination image and a forward destination image that is chronologically later than the destination image, the larger is the value, and the generating includes obtaining a second motion compensated image based on the motion vector with respect to the backward destination image and a third motion compensated image based on the motion vector with respect to the forward destination image and generating the interpolated image according to a weighted average of the motion compensated image, the second motion compensated image, the third motion compensated image, and the failure-preventing image that has been calculated by using a weighting factor based on the motion vector reliability level, the second motion vector reliability level, the third motion vector reliability level, and the failure-preventing vector reliability level.

* * * * *